United States Patent
Williams

(10) Patent No.: US 8,646,808 B2
(45) Date of Patent: Feb. 11, 2014

(54) AIRBAG WITH ACTIVE VENT

(75) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/526,297

(22) Filed: Jun. 18, 2012

(65) Prior Publication Data

US 2013/0334801 A1    Dec. 19, 2013

(51) Int. Cl.
*B60R 21/2338* (2011.01)
*B60R 21/239* (2006.01)

(52) U.S. Cl.
USPC .................. 280/743.2; 280/739; 280/740

(58) Field of Classification Search
USPC ............... 280/739, 735, 740, 743.2, 736, 753
See application file for complete search history.

(56) References Cited

U.S. PATENT DOCUMENTS

| | | | |
|---|---|---|---|
| 3,776,436 A * | 12/1973 | Reidy | 223/1 |
| 4,181,325 A | 1/1980 | Barnett | |
| 5,016,913 A | 5/1991 | Nakajima et al. | |
| 5,172,933 A | 12/1992 | Strasser | |
| 5,240,283 A | 8/1993 | Kishi et al. | |
| 5,246,250 A | 9/1993 | Wolanin et al. | |
| 5,249,824 A * | 10/1993 | Swann et al. | 280/729 |
| 5,280,953 A | 1/1994 | Wolanin et al. | |
| 5,290,953 A | 3/1994 | Clark, Jr. et al. | |
| 5,306,043 A | 4/1994 | Mihm et al. | |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,520,413 A | 5/1996 | Mossi et al. | |
| 5,603,526 A | 2/1997 | Buchanan | |
| 5,775,729 A | 7/1998 | Schneider et al. | |
| 5,839,755 A | 11/1998 | Turnbull | |
| 5,931,497 A | 8/1999 | Fischer | |
| 5,945,184 A | 8/1999 | Nagata et al. | |
| 6,017,057 A | 1/2000 | O'Docherty | |
| 6,056,318 A | 5/2000 | Braunschadel | |
| 6,095,557 A | 8/2000 | Takimoto et al. | |
| 6,126,196 A | 10/2000 | Zimmerman | |

(Continued)

FOREIGN PATENT DOCUMENTS

| AU | 2005294731 | 8/2012 |
|---|---|---|
| DE | 196 40 322 | 3/1996 |

(Continued)

OTHER PUBLICATIONS

Co-pending U.S. Appl. No. 13/762,679 titled Airbag With Slit Vent, filed Feb. 8, 2013.

(Continued)

*Primary Examiner* — Ruth Ilan
*Assistant Examiner* — Darlene P Condra
(74) *Attorney, Agent, or Firm* — Stoel Rives LLP

(57) ABSTRACT

An inflatable airbag assembly can include an airbag cushion and a vent tube having an aperture. Portions of one or more straps can be attached to opposite sides of the vent tube, and a release mechanism can selectively retain the one or more straps. Upon deployment of the airbag cushion while the release mechanism retains the one or more straps, the one or more straps can urge the opposite sides of the vent tube toward each other to assist in closing the aperture of the vent tube.

30 Claims, 14 Drawing Sheets

(56) References Cited

U.S. PATENT DOCUMENTS

| | | | |
|---|---|---|---|
| 6,139,048 A | 10/2000 | Braunschadel | |
| 6,183,003 B1 | 2/2001 | Matsuhashi et al. | |
| 6,206,408 B1 | 3/2001 | Schneider | |
| 6,247,726 B1 | 6/2001 | Ryan | |
| 6,290,257 B1 | 9/2001 | Bunce et al. | |
| 6,371,509 B1 | 4/2002 | Ellerbrok et al. | |
| 6,390,501 B1 | 5/2002 | Greib et al. | |
| 6,398,258 B2 | 6/2002 | Hamada et al. | |
| 6,419,267 B1 | 7/2002 | Hasimoto et al. | |
| 6,554,313 B2 | 4/2003 | Uchida | |
| 6,631,921 B1 | 10/2003 | Drossler et al. | |
| 6,631,922 B2 | 10/2003 | Hess et al. | |
| 6,648,371 B2 | 11/2003 | Vendely et al. | |
| 6,746,045 B2 | 6/2004 | Short et al. | |
| 6,773,027 B2 | 8/2004 | Bohn et al. | |
| 6,773,030 B2 | 8/2004 | Fischer | |
| 6,784,379 B2 | 8/2004 | Breed et al. | |
| 6,786,505 B2 | 9/2004 | Yoshida | |
| 6,832,778 B2 | 12/2004 | Pinsenschaum et al. | |
| 6,863,304 B2 | 3/2005 | Reiter et al. | |
| 6,918,613 B2 | 7/2005 | Short et al. | |
| 6,932,385 B2 | 8/2005 | Hawthorn et al. | |
| 6,962,363 B2 | 11/2005 | Wang | |
| 6,971,664 B2 | 12/2005 | Amamori | |
| 6,971,671 B2 | 12/2005 | Schneider et al. | |
| 7,059,634 B2 | 6/2006 | Bossecker et al. | |
| 7,066,487 B2 | 6/2006 | Sullivan | |
| 7,083,191 B2 | 8/2006 | Fischer | |
| 7,083,192 B2 | 8/2006 | Fischer et al. | |
| 7,195,281 B2 | 3/2007 | Williams et al. | |
| 7,210,702 B2 | 5/2007 | Soderquist | |
| 7,237,802 B2 | 7/2007 | Rose et al. | |
| 7,261,319 B2 | 8/2007 | DePottey et al. | |
| 7,328,915 B2 | 2/2008 | Smith et al. | |
| 7,347,450 B2 | 3/2008 | Williams et al. | |
| 7,360,789 B2 | 4/2008 | Bito | |
| 7,364,192 B2 | 4/2008 | Braun et al. | |
| 7,377,548 B2 | 5/2008 | Bauer et al. | |
| 7,413,218 B2 | 8/2008 | Ekdahl | |
| 7,441,805 B2 | 10/2008 | Jamison | |
| 7,556,290 B2 | 7/2009 | Williams et al. | |
| 7,568,729 B2 | 8/2009 | Schnieder et al. | |
| 7,597,355 B2 | 10/2009 | Williams et al. | |
| 7,597,356 B2 | 10/2009 | Williams | |
| 7,600,782 B2 | 10/2009 | Ishiguro et al. | |
| 7,604,252 B2 | 10/2009 | Heitplatz et al. | |
| 7,607,689 B2 | 10/2009 | Kalczynski et al. | |
| 7,607,690 B2 | 10/2009 | Abe et al. | |
| 7,614,653 B2 | 11/2009 | Rose et al. | |
| 7,614,654 B2 | 11/2009 | Williams | |
| 7,635,148 B2 * | 12/2009 | Sager | 280/739 |
| 7,648,166 B2 * | 1/2010 | Maripudi | 280/740 |
| 7,651,130 B2 | 1/2010 | Bauberger | |
| 7,654,561 B2 | 2/2010 | Webber et al. | |
| 7,673,899 B2 | 3/2010 | Abe | |
| 7,722,080 B2 | 5/2010 | Rose | |
| 7,726,685 B2 | 6/2010 | Abe et al. | |
| 7,731,231 B2 * | 6/2010 | Schneider et al. | 280/739 |
| 7,748,738 B2 | 7/2010 | Schneider | |
| 7,762,576 B2 | 7/2010 | Cho | |
| 7,770,925 B2 | 8/2010 | Seymour et al. | |
| 7,770,926 B2 | 8/2010 | Schneider | |
| 7,784,828 B2 | 8/2010 | Mills et al. | |
| 7,841,623 B2 * | 11/2010 | Ito | 280/743.2 |
| 7,857,347 B2 | 12/2010 | Abe et al. | |
| 7,878,538 B2 | 2/2011 | Abe et al. | |
| 7,931,297 B2 | 4/2011 | Abe et al. | |
| 7,938,444 B2 | 5/2011 | Williams et al. | |
| 7,938,445 B2 | 5/2011 | Smith et al. | |
| 7,946,613 B2 | 5/2011 | Rose et al. | |
| 7,946,618 B2 * | 5/2011 | Fukawatase et al. | 280/739 |
| 7,959,184 B2 | 6/2011 | Fukawatase et al. | |
| 8,047,570 B2 | 11/2011 | Feller | |
| 8,061,734 B2 * | 11/2011 | Parks et al. | 280/739 |
| 8,070,183 B2 | 12/2011 | Kumagai et al. | |
| 8,191,925 B2 | 6/2012 | Williams | |
| 8,226,118 B2 | 7/2012 | Rose et al. | |
| 2002/0117840 A1 | 8/2002 | Dunkle et al. | |
| 2003/0020266 A1 | 1/2003 | Vendely et al. | |
| 2003/0020268 A1 | 1/2003 | Reiter et al. | |
| 2003/0030254 A1 | 2/2003 | Hasebe | |
| 2003/0057691 A1 | 3/2003 | Tokita et al. | |
| 2003/0127839 A1 | 7/2003 | Jenkins | |
| 2003/0209895 A1 | 11/2003 | Gu | |
| 2003/0214125 A1 | 11/2003 | Schneider et al. | |
| 2004/0012179 A1 | 1/2004 | Pinsenschaum et al. | |
| 2004/0056459 A1 | 3/2004 | Kassman et al. | |
| 2004/0090054 A1 | 5/2004 | Bossecker et al. | |
| 2004/0130135 A1 | 7/2004 | Ekdahl | |
| 2004/0188990 A1 | 9/2004 | Short et al. | |
| 2004/0207186 A1 * | 10/2004 | Kai | 280/731 |
| 2004/0256842 A1 | 12/2004 | Breed et al. | |
| 2005/0052008 A1 | 3/2005 | Rose et al. | |
| 2005/0057027 A1 | 3/2005 | Fogle et al. | |
| 2005/0098990 A1 | 5/2005 | Pinsenschaum et al. | |
| 2005/0236822 A1 | 10/2005 | Rose et al. | |
| 2005/0248137 A1 | 11/2005 | Delventhal et al. | |
| 2006/0001244 A1 | 1/2006 | Taguchi et al. | |
| 2006/0071461 A1 | 4/2006 | Williams et al. | |
| 2006/0071462 A1 | 4/2006 | Smith et al. | |
| 2006/0151979 A1 | 7/2006 | DePottey et al. | |
| 2006/0192370 A1 | 8/2006 | Abe et al. | |
| 2006/0197327 A1 | 9/2006 | Maripudi et al. | |
| 2006/0202454 A1 | 9/2006 | Parizal et al. | |
| 2006/0284404 A1 | 12/2006 | Green et al. | |
| 2007/0045997 A1 | 3/2007 | Abe et al. | |
| 2007/0052222 A1 | 3/2007 | Higuchi et al. | |
| 2007/0108750 A1 | 5/2007 | Bauer et al. | |
| 2007/0126218 A1 | 6/2007 | Schnieder et al. | |
| 2007/0126219 A1 | 6/2007 | Williams | |
| 2007/0132222 A1 | 6/2007 | Thomas et al. | |
| 2007/0205590 A1 | 9/2007 | Klinkenberger et al. | |
| 2007/0216146 A1 | 9/2007 | Williams | |
| 2008/0007038 A1 | 1/2008 | Fischer et al. | |
| 2008/0018086 A1 | 1/2008 | Ford et al. | |
| 2008/0023950 A1 | 1/2008 | Kalczynski et al. | |
| 2008/0023959 A1 | 1/2008 | Crawford | |
| 2008/0073890 A1 | 3/2008 | Williams et al. | |
| 2008/0073891 A1 | 3/2008 | Rose et al. | |
| 2008/0073892 A1 | 3/2008 | Rose et al. | |
| 2008/0073893 A1 | 3/2008 | Schneider | |
| 2008/0079250 A1 | 4/2008 | Boyle et al. | |
| 2008/0203713 A1 | 8/2008 | McFadden et al. | |
| 2008/0303256 A1 | 12/2008 | Williams | |
| 2009/0033081 A1 | 2/2009 | Flischer et al. | |
| 2009/0039630 A1 | 2/2009 | Schneider et al. | |
| 2009/0188900 A1 * | 7/2009 | Cali et al. | 219/121.67 |
| 2009/0230663 A1 | 9/2009 | Mills et al. | |
| 2009/0256338 A1 | 10/2009 | Williams | |
| 2010/0019476 A1 | 1/2010 | Pausch | |
| 2010/0032931 A1 | 2/2010 | Kumagai et al. | |
| 2010/0102542 A1 | 4/2010 | Nakajima et al. | |
| 2010/0225094 A1 | 9/2010 | Rose et al. | |
| 2010/0225095 A1 | 9/2010 | Smith et al. | |
| 2010/0264634 A1 * | 10/2010 | Kuhne et al. | 280/743.2 |
| 2011/0031725 A1 | 2/2011 | Rose et al. | |
| 2011/0227321 A1 * | 9/2011 | Sager | 280/743.2 |
| 2012/0280477 A1 | 11/2012 | Young et al. | |

FOREIGN PATENT DOCUMENTS

| | | |
|---|---|---|
| DE | 10059956 | 6/2002 |
| EP | 0 458 838 | 5/1996 |
| EP | 1398228 | 3/2004 |
| EP | 1824710 | 6/2009 |
| EP | 1960240 | 8/2011 |
| GB | 2328646 | 3/1999 |
| JP | 03-281460 | 12/1991 |
| JP | 05085295 | 4/1993 |
| JP | 08268213 | 10/1996 |
| JP | 2001-158315 | 6/2001 |
| JP | 2003-137060 | 4/2003 |
| JP | 2004-262432 | 9/2004 |
| JP | 4871286 | 11/2011 |

(56) References Cited

FOREIGN PATENT DOCUMENTS

| MX | 282893 | 1/2011 |
|---|---|---|
| WO | WO 2004/045919 | 6/2004 |
| WO | WO 2006/041547 | 4/2006 |
| WO | WO 2006/041552 | 4/2006 |
| WO | WO 2006/073534 | 7/2006 |
| WO | WO 2007/067371 | 6/2007 |
| WO | WO 2007/067377 | 6/2007 |
| WO | WO 2009/020786 | 8/2009 |
| WO | WO 2008/150578 | 12/2009 |
| WO | WO 2010/101673 | 9/2010 |

OTHER PUBLICATIONS

Office Action issued Mar. 15, 2006 in U.S. Appl. No. 10/832,843, now U.S. Patent No. 7,237,802.
Response to First Office Action filed Jun. 19, 2006 in U.S. Appl. No. 10/832,843, now U.S. Patent No. 7,237,802.
Notice of Allowance and Fee(s) Due issued Jun. 22, 2006 in U.S. Appl. No. 10/832,843, now U.S. Patent No. 7,237,802.
Request for Continued Examination filed Sep. 20, 2006 in U.S. Appl. No. 10/832,843, now U.S. Patent No. 7,237,802.
Notice of Allowance and Fee(s) Due issued Oct. 3, 2006 in U.S. Appl. No. 10/832,843, now U.S. Patent No. 7,237,802.
Office Action issued Jun. 27, 2006 in U.S. Appl. No. 10/959,387, now U.S. Patent No. 7,328,915.
Interview Summary issued Jan. 30, 2007 in U.S. Appl. No. 10/959,387, now U.S. Patent No. 7,328,915.
Amendment and Response to Office Action filed Feb. 20, 2007 in U.S. Appl. No. 10/959,387, now U.S. Patent No. 7,328,915.
Office Action issued May 2, 2007 in U.S. Appl. No. 10/959,387, now U.S. Patent No. 7,328,915.
Amendment and Response to Office Action filed Aug. 7, 2007 in U.S. Appl. No. 10/959,387, now U.S. Patent No. 7,328,915.
Notice of Allowance issued Oct. 5, 2007 in U.S. Appl. No. 10/959,387, now U.S. Patent No. 7,328,915.
Preliminary Amendment filed Mar. 10, 2005 in U.S. Appl. No. 10/959,256, now U.S. Patent No. 7,347,450.
Office Action issued Nov. 15, 2006 in U.S. Appl. No. 10/959,256, now U.S. Patent No. 7,347,450.
Interview Summary issued Jan. 23, 2007 in U.S. Appl. No. 10/959,256, now U.S. Patent No. 7,347,450.
Amendment and Response to Office Action filed Feb. 15, 2007 in U.S. Appl. No. 10/959,256, now U.S. Patent No. 7,347,450.
Office Action issued May 21, 2007 in U.S. Appl. No. 10/959,256, now U.S. Patent No. 7,347,450.
Amendment and Response to Office Action filed Aug. 17, 2007 in U.S. Appl. No. 10/959,256, now U.S. Patent No. 7,347,450.
Notice of Allowance and Fee(s) Due issued Nov. 27, 2007 in U.S. Appl. No. 10/959,256, now U.S. Patent No. 7,347,450.
Restriction Requirement issued Apr. 7, 2008 in U.S. Appl. No. 11/295,953, now U.S. Patent No. 7,568,729.
Response to Restriction Requirement filed Apr. 24, 2008 in U.S. Appl. No. 11/295,953, now U.S. Patent No. 7,568,729.
Office Action issued Jul. 1, 2008 in U.S. Appl. No. 11/295,953, now U.S. Patent No. 7,568,729.
Terminal Disclaimer and Amendment and Response to Office Action filed Dec. 1, 2008 in U.S. Appl. No. 11/295,953, now U.S. Patent No. 7,568,729.
Approval of Terminal Disclaimed issued in U.S. Appl. No. 11/295,953, now U.S. Patent No. 7,568,729.
Notice of Allowance and Fee(s) Due issued Apr. 2, 2009 in U.S. Appl. No. 11/295,953, now U.S. Patent No. 7,568,729.
Office Action issued Jun. 4, 2007 in U.S. Appl. No. 11/296,031, now U.S. Patent No. 7,614,654.
Amendment and Response to Office Action filed Dec. 4, 2007 in U.S. Appl. No. 11/296,031, now U.S. Patent No. 7,614,654.
Office Action issued Apr. 21, 2008 in U.S. Appl. No. 11/296,031, now U.S. Patent No. 7,614,654.
Amendment and Response to Office Action filed Jul. 21, 2008 in U.S. Appl. No. 11/296,031, now U.S. Patent No. 7,614,654.
Interview Summary issued Dec. 17, 2008 in U.S. Appl. No. 11/296,031, now U.S. Patent No. 7,614,654.
Office Action issued Oct. 21, 2008 in U.S. Appl. No. 11/296,031, now U.S. Patent No. 7,614,654.
Amendment and Response to Office Action filed Apr. 20, 2009 in U.S. Appl. No. 11/296,031, now U.S. Patent No. 7,614,654.
Notice of Allowance and Fee(s) Due issued Jul. 29, 2009 in U.S. Appl. No. 11/296,031, now U.S. Patent No. 7,614,654.
Supplemental Notice of Allowability issued Sep. 2, 2009 in U.S. Appl. No. 11/296,031, now U.S. Patent No. 7,614,654.
Office Action issued Jul. 11, 2008 in U.S. Appl. No. 11/528,118, now U.S. Patent No. 7,556,290.
Amendment and Response to Office Action issued Nov. 25, 2008 in U.S. Appl. No. 11/528,118, now U.S. Patent No. 7,556,290.
Interview Summary issued Dec. 15, 2008 in U.S. Appl. No. 11/528,118, now U.S. Patent No. 7,556,290.
Notice of Allowance and Fee(s) Due issued Feb. 10, 2009 in U.S. Appl. No. 11/528,118, now U.S. Patent No. 7,556,290.
Request for Continued Examination filed Mar. 6, 2009 in U.S. Appl. No. 11/528,118, now U.S. Patent No. 7,556,290.
Notice of Allowance and Fee(s) Due issued Mar. 23, 2009 in U.S. Appl. No. 11/528,118, now U.S. Patent No. 7,556,290.
Office Action issued Jun. 30, 2008 in U.S. Appl. No. 11/528,266, now U.S. Patent No. 7,722,080.
Amendment and Response to Office Action in U.S. Appl. No. 11/528,266, now U.S. Patent No. 7,722,080.
Interview Summary issued Dec. 16, 2008 in U.S. Appl. No. 11/528,266, now U.S. Patent No. 7,722,080.
Notice of Allowance and Fee(s) Due issued Jan. 14, 2009 in U.S. Appl. No. 11/528,266, now U.S. Patent No. 7,722,080.
Summary of Interview filed Jan. 16, 2009 in U.S. Appl. No. 11/528,266, now U.S. Patent No. 7,722,080.
Request for Continued Examination filed Mar. 6, 2009 in U.S. Appl. No. 11/528,266, now U.S. Patent No. 7,722,080.
Office Action issued Mar. 19, 2009 in U.S. Appl. No. 11/528,266, now U.S. Patent No. 7,722,080.
Terminal Disclaimer and Amendment and Response to Office Action filed Sep. 9, 2009 in U.S. Appl. No. 11/528,266, now U.S. Patent No. 7,722,080.
Disapproval of Terminal Disclaimer issued in U.S. Appl. No. 11/528,266, now U.S. Patent No. 7,722,080.
Terminal Disclaimer filed Oct. 19, 2009 in U.S. Appl. No. 11/528,266, now U.S. Patent No. 7,722,080.
Office Action issued Oct. 21, 2009 in U.S. Appl. No. 11/528,266, now U.S. Patent No. 7,722,080.
Approval of Terminal Disclaimer issued in U.S. Appl. No. 11/528,266, now U.S. Patent No. 7,722,080.
Notice of Allowance and Fee(s) Due issued Dec. 16, 2009 in U.S. Appl. No. 11/528,266, now U.S. Patent No. 7,722,080.
Notice of Improper Request for Continued Examination issued Jan. 28, 2010 in U.S. Appl. No. 11/528,266, now U.S. Patent No. 7,722,080.
Office Action issued Jan. 2, 2009 in U.S. Appl. No. 11/528,042, now U.S. Patent No. 7,748,738.
Amendment and Response to Office Action filed Jul. 2, 2009 in U.S. Appl. No. 11/528,042, now U.S. Patent No. 7,748,738.
Notice of Allowance and Fee(s) Due issued Nov. 5, 2009 in U.S. Appl. No. 11/528,042, now U.S. Patent No. 7,748,738.
Office Action issued Nov. 12, 2009 in U.S. Appl. No. 11/528,265, now U.S. Patent No. 7,614,653.
Supplemental Office Action issued Nov. 18, 2008 in U.S. Appl. No. 11/528,265, now U.S. Patent No. 7,614,653.
Amendment and Response to Office Action filed Mar. 16, 2009 in U.S. Appl. No. 11/528,265, now U.S. Patent No. 7,614,653.
Notice of Allowance and Fee(s) Due issued Jun. 16, 2009 in U.S. Appl. No. 11/528,265, now U.S. Patent No. 7,614,653.
Office Action issued Nov. 17, 2008 in U.S. Appl. No. 11/589,316, now U.S. Patent No. 7,597,355.
Interview Summary issued Dec. 19, 2008 in U.S. Appl. No. 11/589,316, now U.S. Patent No. 7,597,355.
Amendment and Response to Office Action filed Apr. 17, 2009 in U.S. Appl. No. 11/589,316, now U.S. Patent No. 7,597,355.

(56) References Cited

OTHER PUBLICATIONS

Notice of Allowance and Fee(s) Due issued Jun. 17, 2009 in U.S. Appl. No. 11/589,316, now U.S. Patent No. 7,597,355.
Office Action issued Dec. 2, 2008 in U.S. Appl. No. 11/758,419, now U.S. Patent No. 7,597,356.
Interview Summary issued Mar. 17, 2009 in U.S. Appl. No. 11/758,419, now U.S. Patent No. 7,597,356.
Amendment and Response to Office Action filed ,Apr. 21, 2009 in U.S. Appl. No. 11/758,419, now U.S. Patent No. 7,597,356.
Notice of Allowance and Fee(s) Due issued Jun. 19, 2009 in U.S. Appl. No. 11/758,419, now U.S. Patent No. 7,597,356.
Office Action issued Sep. 4, 2009 in U.S. Appl. No. 11/836,499, now U.S. Patent No. 7,770,926.
Amendment and Response to Office Action filed Mar. 1, 2010 in U.S. Appl. No. 11/836,499, now U.S. Patent No. 7,770,926.
Interview Summary issued Mar. 15, 2010 in U.S. Appl. No. 11/836,499, now U.S. Patent No. 7,770,926.
Notice of Allowance and Fee(s) due issued Apr. 16, 2010 in U.S. Appl. No. 11/836,499, now U.S. Patent No. 7,770,926.
Office Communication issued Jun. 25, 2010 in U.S. Appl. No. 11/836,499, now U.S. Patent No. 7,770,926.
Office Action issued Dec. 28, 2009 in U.S. Appl. No. 12/046,014, now U.S. Patent No. 7,784,828.
Amendment and Response to Office Action filed Mar. 29, 2010 in U.S. Appl. No. 12/046,014, now U.S. Patent No. 7,784,828.
Notice of Allowance and Fee(s) Due issued May 6, 2010 in U.S. Appl. No. 12/046,014, now U.S. Patent No. 7,784,828.
Office Action issued Apr. 2, 2010 in co-pending U.S. Appl. No. 12/102,581, now issued as U.S. Patent No. 8,191,925.
Interview Summary issued Jun. 16, 2010 in co-pending U.S. Appl. No. 12/102,581, now issued as U.S. Patent No. 8,191,925.
Amendment and Response to Office Action filed Jun. 29, 2010 in co-pending U.S. Appl. No. 12/102,581, now issued as U.S. Patent No. 8,191,925.
Final Office Action mailed Oct. 27, 2010 in co-pending U.S. Appl. No. 12/102,581, now issued as U.S. Patent No. 8,191,925.
RCE and Amendment and Response to Office Action filed Mar. 28, 2011 in co-pending U.S. Appl. No. 12/102,581, now issued as U.S. Patent No. 8,191,925.
Office Action mailed Jun. 22, 2011 in co-pending U.S. Appl. No. 12/102,581, now issued as U.S. Patent No. 8,191,925.
Notice of Allowance mailed Mar. 28, 2012 in co-pending U.S. Appl. No. 12/102,581, now issued as U.S. Patent No. 8,191,925.
Restriction Requirement issued Jul. 21, 2010 in co-pending U.S. Appl. No. 12/397,019, now issued as U.S. Patent No. 7,946,613.
Amendment and Response to Requirement for Election of Species filed Aug. 23, 2010 in co-pending U.S. Appl. No. 12/397,019, now issued as U.S. Patent No. 7,946,613.
Office Action mailed Sep. 17, 2010 in co-pending U.S. Appl. No. 12/397,019, now issued as U.S. Patent No. 7,946,613.
Amendment and Response to Office Action filed Jan. 6, 2011 in co-pending U.S. Appl. No. 12/397,019, now issued as U.S. Patent No. 7,946,613.
Notice of Allowance mailed Mar. 16, 2011 in co-pending U.S. Appl. No. 12/397,019, now issued as U.S. Patent No. 7,946,613.
Office Action issued Jul. 9, 2010 in co-pending U.S. Appl. No. 12/397,251, now issued as U.S. Patent No. 7,938,445.
Terminal Disclaimer and Response to Office Action filed Jan. 10, 2011 in co-pending U.S. Appl. No. 12/397,251, now issued as U.S. Patent No. 7,938,445.
Notice of Allowance mailed Mar. 21, 2011 in co-pending U.S. Appl. No. 12/397,251, now issued as U.S. Patent No. 7,938,445.
Notice of Allowance mailed Mar. 28, 2012 in co-pending U.S. Appl. No. 12/536,360, now issued as U.S. Patent No. 8,226,118.
Notification of Transmittal of the International Search Report and the Written Opinion of the International Searching Authority issued Oct. 19, 2006 in International Application No. PCT/US2005/025416.
Notification of Transmittal of the International Search Report and the Written Opinion of the International Searching Authority issued Dec. 15, 2006 in International Application No. PCT/US2005/027255.
Notification of Transmittal of the International Search Report and the Written Opinion of the International Searching Authority issued Aug. 20, 2007 in International Application No. PCT/US2006/045367.
Notification of Transmittal of the International Search Report and the Written Opinion of the International Searching Authority issued Sep. 5, 2007 in International Application No. PCT/US2006/045441.
Notification of Transmittal of the International Search Report and the Written Opinion of the International Searching Authority issued Mar. 9, 2007 in International Application No. PCT/US2005/038175.
Notification of Transmittal of the International Search Report and the Written Opinion of the International Searching Authority issued Oct. 22, 2008 in International Application No. PCT/US2008/071337.
Notification of Transmittal of the International Search Report and the Written Opinion of the International Searching Authority issued Aug. 15, 2008 in International Application No. PCT/US2008/060226.
Notification of Transmittal of the International Search Report and the Written Opinion of the International Searching Authority issued Jun. 2, 2009 in International Application No. PCT/US2009/040031.
Notification of Transmittal of the International Search Report and the Written Opinion of the International Searching Authority issued Mar. 29, 2010 in International Application No. PCT/US2010/021341.
Extended European Search Report dated May 4, 2010 in corresponding European patent application No. 06838372.8, now issued as European Patent No. 1,960,240.
Supplementary European Search Report dated Nov. 7, 2007 in European patent application No. 05777506.6, now issued as European Patent No. 1,824,710.
Written Opinion of the International Searching Authority dated Aug. 8, 2013 that issued in International Application No. PCT/US13/46131 (which claims priority to U.S. Appl. No. 13/526,297).
International Search Report dated Aug. 8, 2013 that issued in International Application No. PCT/US13/46131 (which claims priority to U.S. Appl. No. 13/526,297).

\* cited by examiner

AIRBAG WITH ACTIVE VENT

BACKGROUND

Airbags that include one or more active vents can achieve various deployment configurations, which may be selected or adjusted depending, for example, on occupant conditions within a vehicle at the time of deployment. In some instances, the airbags can suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
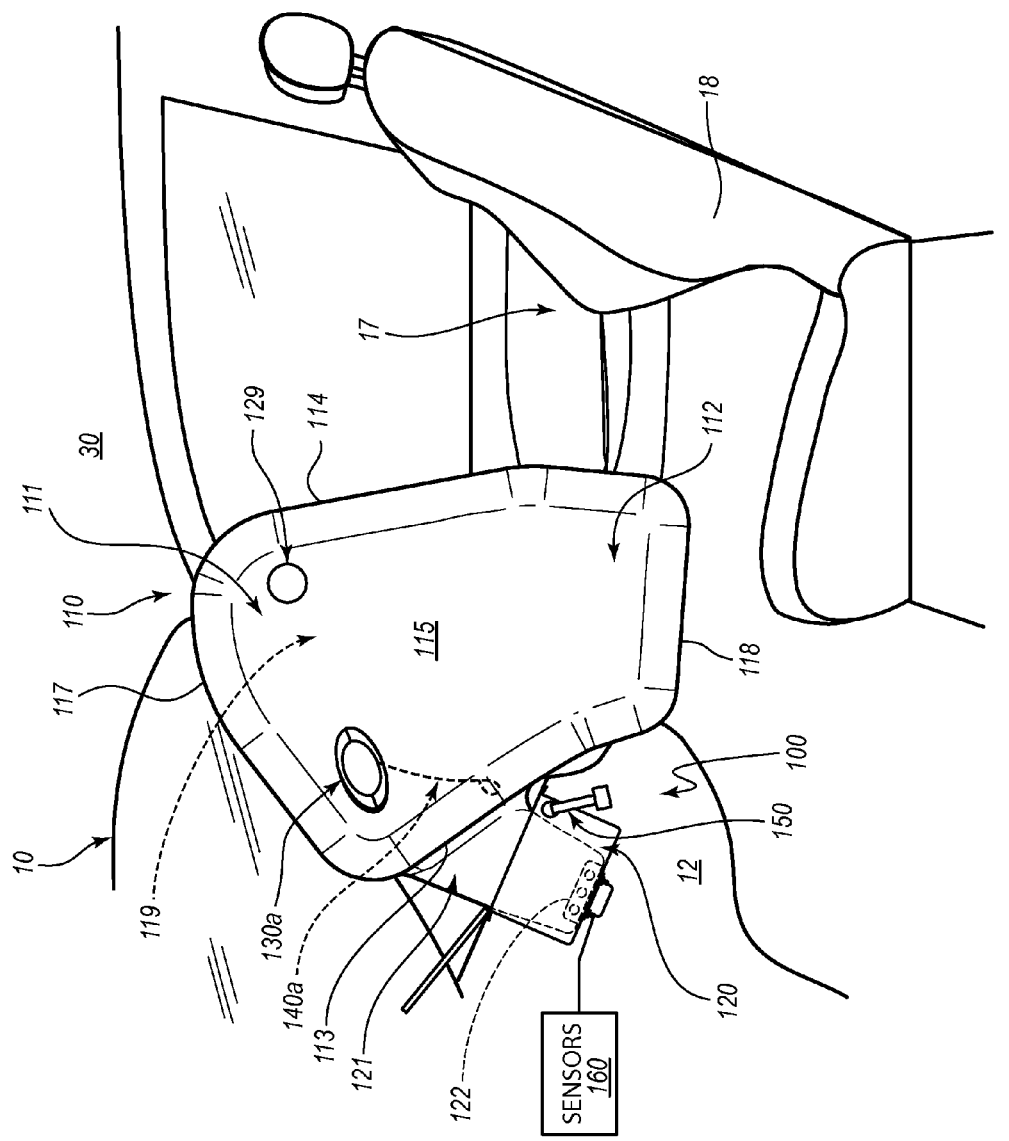
FIG. 1 is a side elevation view of an embodiment of an airbag assembly that includes an airbag cushion that is shown in a fully inflated state within a cabin of a vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to", "coupled to," and "in communication with" are used in their ordinary sense, and are broad enough to refer to any suitable form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive).

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other suitable airbag type. Accordingly, although the drawings generally depict embodiments involving front airbags, other embodiments may involve other airbag types.

Front airbags are typically installed in the steering wheel and instrument panel of a vehicle. During installation, the airbags are rolled and/or folded, and may be retained in the packaged state behind a cover. During a collision event, an inflator is triggered, which rapidly fills the airbag with inflation gas. Thus, the airbag rapidly changes from a rolled and/or folded configuration (also referred to as a packaged configuration) to an expanded or deployed configuration. The inflator may be triggered by any suitable device or system, and the triggering may be in response to and/or influenced by one or more vehicle sensors.

An airbag may provide cushioning for occupants over a range of sizes and seating positions. Other or further conditions within a vehicle may also vary from one collision scenario to another, such as whether a vehicle occupant is wearing a seat belt. Accordingly, it can be advantageous for an airbag to be capable of deploying with a hardness or support, and/or to deploy at a rate, that is suitable for the occupant's cushioning requirements. For example, when an occupant is out of position, seated too closely to a surface from which an airbag will deploy, and/or has a small stature, it can be advantageous for an airbag to have a soft cushion and/or to inflate relatively slowly or to only a partial amount. The hardness of an airbag cushion membrane and/or other deployment characteristics (e.g., rate of inflation) may be modulated by selective venting of inflation gas from inside the cushion to outside of the cushion.

Figure 2:
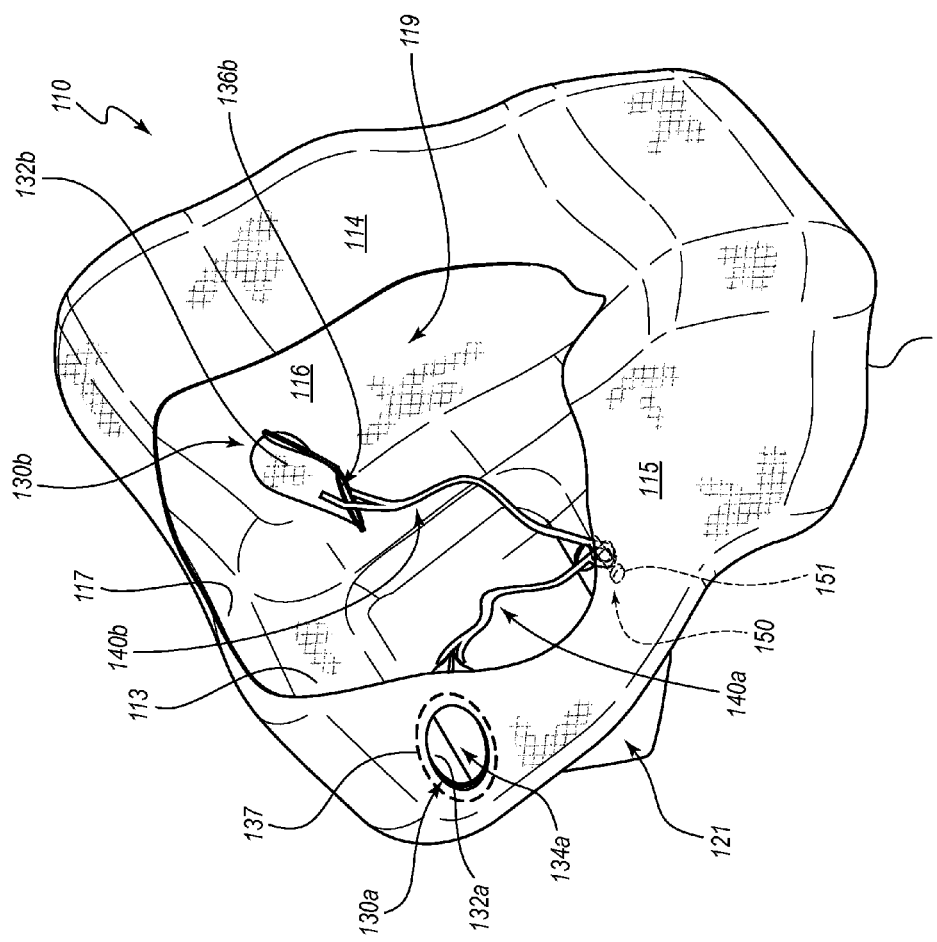
FIG. 2 is a perspective view of the airbag assembly of FIG. 1, wherein a portion of the airbag cushion shown in cutaway, and wherein the airbag cushion is not fully inflated.

FIGS. 1 and 2 depict an embodiment of an airbag assembly 100. The airbag assembly 100 includes an airbag cushion 110 (which may also be referred to as a cushion membrane or as a cushion), which is shown in a fully deployed state. Airbag assembly 100 may further comprise a housing 120 with an inflator 122, one or more active vents 130a, 130b, one or more vent straps 140a, 140b, and a strap release mechanism, or release device, 150. In an undeployed state, assembly 100 may be configured to be packaged and mounted within an instrument panel 12 or steering wheel located at the front of a vehicle 10. Upon detection of one or more predetermined vehicle conditions by one or more vehicle sensors, as discussed further below, the cushion 110 may deploy out of the instrument panel or steering wheel toward an intended occupant position 17 of a occupant seat 18.

In some embodiments, cushion 110 has an upper portion 111 a lower portion 112; a front panel 113 having a front face directed toward a front end of the vehicle 10; a rear panel 114 having a rear face directed toward the rear end of the vehicle; a first side panel 115; a second side panel 116 positioned opposite the first side panel 115, an upper panel 117, and a lower panel 118. The various panels of cushion membrane 110 define an interior inflatable void 119, which is in fluid communication with the inflator 122. The inflatable void 119 may also be referred to herein as an interior volume. Upper portion 111 of cushion 110 is the portion of the cushion that is closest to the headliner 30 of the vehicle 10 when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

In some embodiments, a throat portion 121 extends forwardly and or downwardly from the front panel 113. The throat portion 121 can be coupled with the housing and/or the inflator 122, and it may be in fluid communication with the inflator 122 such that inflation gases exit the inflator 122 and pass through the throat portion 121 into other portions of the airbag cushion 110 during deployment.

The various panels 113, 114, 115, 116, 117, 118 and/or the throat portion 121 can be connected to each other in any suitable fashion. In some embodiments, a single piece of fabric comprises one or more of the panels, whereas in other embodiments, each panel may comprise a separate piece of material. More or fewer panels are possible.

A variety of types and configurations of airbag cushion membranes are possible, which may be similar to or quite different from that illustrated in FIG. 1. For example, the size, shape, and proportions of the cushion 110 may vary according to its use in different vehicles or different locations within a vehicle. In some instances, the cushion may comprise an inflatable curtain cushion; a rear passenger side airbag; a driver's airbag; and/or a front passenger airbag. The cushion 110 may comprise one or more of any material well known in the art, such as a woven nylon fabric. In various embodiments, the airbag cushion 110 may be manufactured using a variety of techniques such as one-piece weaving, cut-and-sew, or a combination of these techniques. The cushion 110 may be manufactured using sealed or unsealed seams, wherein the seams are formed by stitching, adhesive, taping, radio frequency welding, heat sealing, or any other suitable technique or combination of techniques.

Retention of inflation gas within the cushion can be modulated by the presence of one or more permanent, fixed, or discrete vents 129, which are configured to allow for inflation gas to exit the interior of the cushion 110. In other or further embodiments, internal and/or external tethers may be used to achieve a desired predetermined shape of a fully inflated airbag cushion 110. The tethers can limit the expansion of the airbag cushion 110 and restrict it to a specific shape. Tethers can be coupled to one or more surfaces of a cushion membrane and extend to another surface of the cushion, the airbag housing, or a vehicle structure. No shape-defining tethers are shown in the illustrated embodiment, although in some instances, the vent straps 140a, 140b may exhibit one or more characteristics of a shape-defining tether. The vent straps 140a, 140b may also be referred to as tethers.

Housing 120 may comprise a container formed of metal and/or any other suitable material that is fixedly attached to cushion 100 via the throat portion 121 of the cushion 110. Housing 120 is configured to be mounted within the vehicle 10 and can serve to specifically position airbag assembly 100 so that the cushion 100 may deploy with predetermined characteristics. In the packaged, undeployed state, cushion 110 is contained within housing 120. Cushion 110 may be rolled and/or folded in any suitable fashion so as to be retained within the housing 120 in this undeployed state. Housing 120 is configured to allow for fluid communication between void 119 of cushion 110 and the inflator 122. The inflator 122 is configured to be activated in response to predetermined vehicle conditions, which may be determined by one or more vehicle sensors 160. The one or more vehicle sensors 160 are depicted schematically in FIG. 1. In some embodiments, the sensors 160 are in direct electrical communication with the inflator 122, and may directly actuate the inflator 122. In other embodiments, a control unit (not shown) may be in communication with the sensors 160, and the control unit may actuate the inflator 122 in response to signals and/or data received from the sensors 160. Upon activation, the inflator rapidly generates or releases inflation gas, which can force the airbag cushion 110 through a cosmetic cover (not shown) and rapidly inflates the cushion 110. The inflator 122 may be of any suitable variety, such as pyrotechnic, stored gas, or a combination inflator. Additionally, the inflator may comprise a single or multistage inflator.

Any suitable type and configuration of airbag housing 120 is possible. For example, in some embodiments, the housing 120 comprises fabric that may or may not further comprise a mounting structure. Also, the housing 120 may have an integrated inflator 122, or the housing 120 may be used to mount the inflator 122 within the vehicle 10. In other embodiments, the housing 120 may not be attached to the inflator 122 and a path of inflation gas travel may not flow through the housing. In some embodiments, when the cushion 110 is in the packaged state, a deployment flap (not shown) may be disposed between the inflatable cushion membrane 110 and a top portion of the housing 120, which may comprise a cosmetic cover. During airbag deployment, the deployment flap may function to protect the cushion membrane from damage caused by the housing, cosmetic cover edges, or other structures disposed near the housing and in the path of the deploying cushion membrane.

With continued reference to FIGS. 1 and 2, the active vents 130a, 130b can each comprise a respective vent tube 132a, 132b, each of which is attached to a respective strap 140a, 140b. Each vent tube 132a, 132b can be attached to the cushion 110 about an opening or aperture 134a, 134b (see FIG. 5) that extends through a cushion panel (e.g., the panels 115, 116, respectively). In the illustrated embodiment, each vent tube 132a, 132b is attached to the cushion 110 via any suitable stitching 137. Any other suitable attachment technique, such as those described elsewhere herein, is possible.

Figure 3:
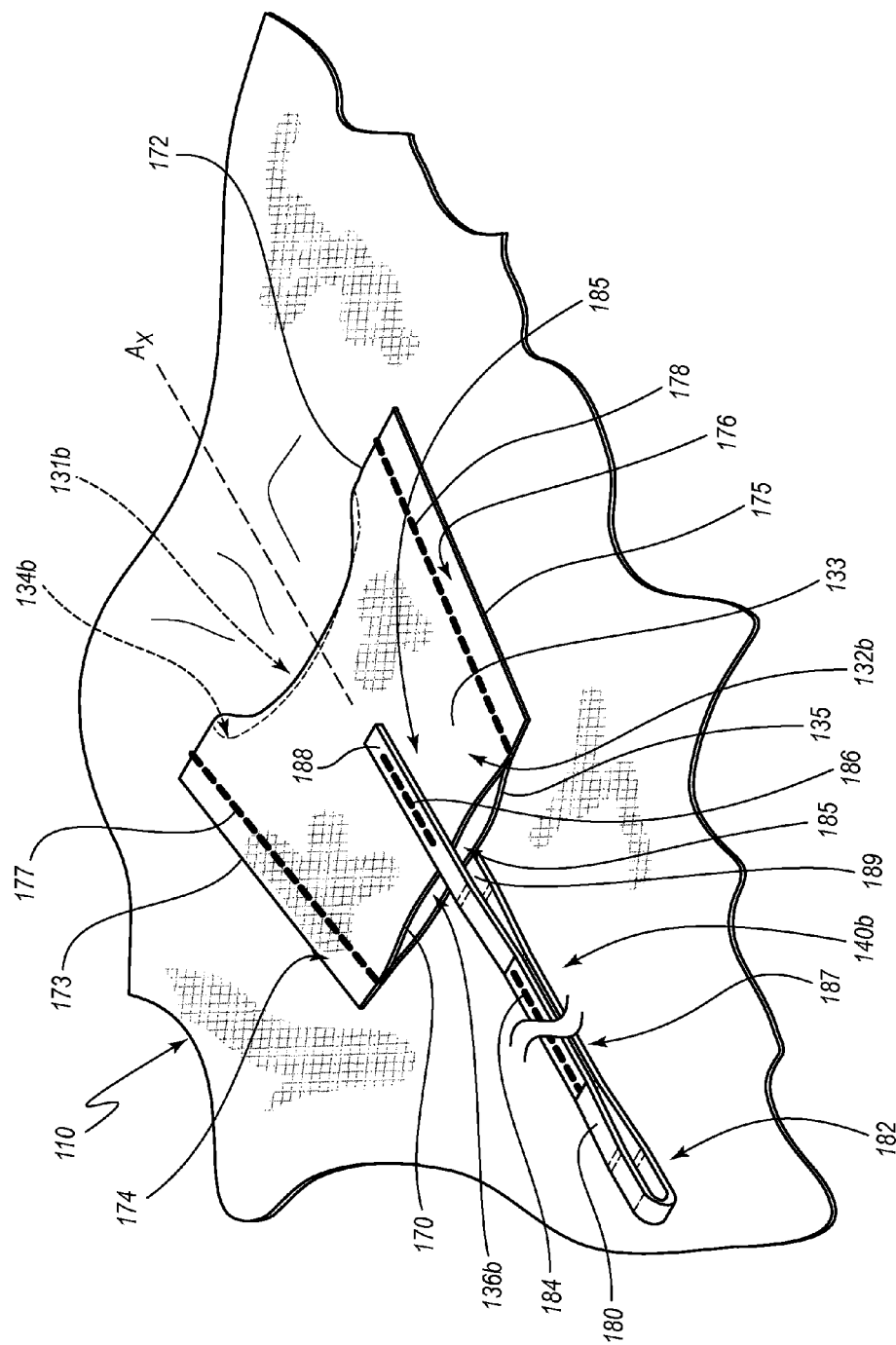
FIG. 3 is another perspective view of a portion of the airbag assembly of FIG. 1 showing an active vent in detail.

FIG. 3 depicts an embodiment of the active vent 130b and its associated strap 140b in greater detail. In the illustrated embodiment, the active vents 130a, 130b and straps 140a, 140b can be substantially identical to each other, thus the discussion of the vent 130b and strap 140b is equally relevant to the active vent 130a and the strap 140a. In other embodiments, the active vent 130a and/or strap 140a may differ from the active vent 130b and strap 140b in any suitable manner. Moreover, in some embodiments, only a single active vent 130a (or 130b) is used, whereas in other embodiments, more than two active vents are used. In still further embodiments, active or dynamic vents in addition to the one or more active vents 130a, 130b may be used, such as, for example, those disclosed in U.S. Pat. No. 8,191,925 titled DYNAMIC SAFETY VENT, which issued on Jun. 5, 2012, the entire contents of which are incorporated by reference herein.

In the illustrated embodiment, the vent tube 132b includes two panel portions or flaps 133, 135 that are positioned against one another and secured along their lateral sides (e.g., near their lateral edges 174, 176) via stitches, or stitching, 177, 178. Due to the space between the stitches 177, 178 and the respective lateral edges 174, 176, the vent tube 132b includes lateral flanges 174, 176. The additional material associated with the lateral flanges 174, 176 and/or the reinforcement of the stitches 177, 178 themselves can contribute to an increased stiffness or reinforced region along the lateral sides of the vent tube 132b.

Figure 10:
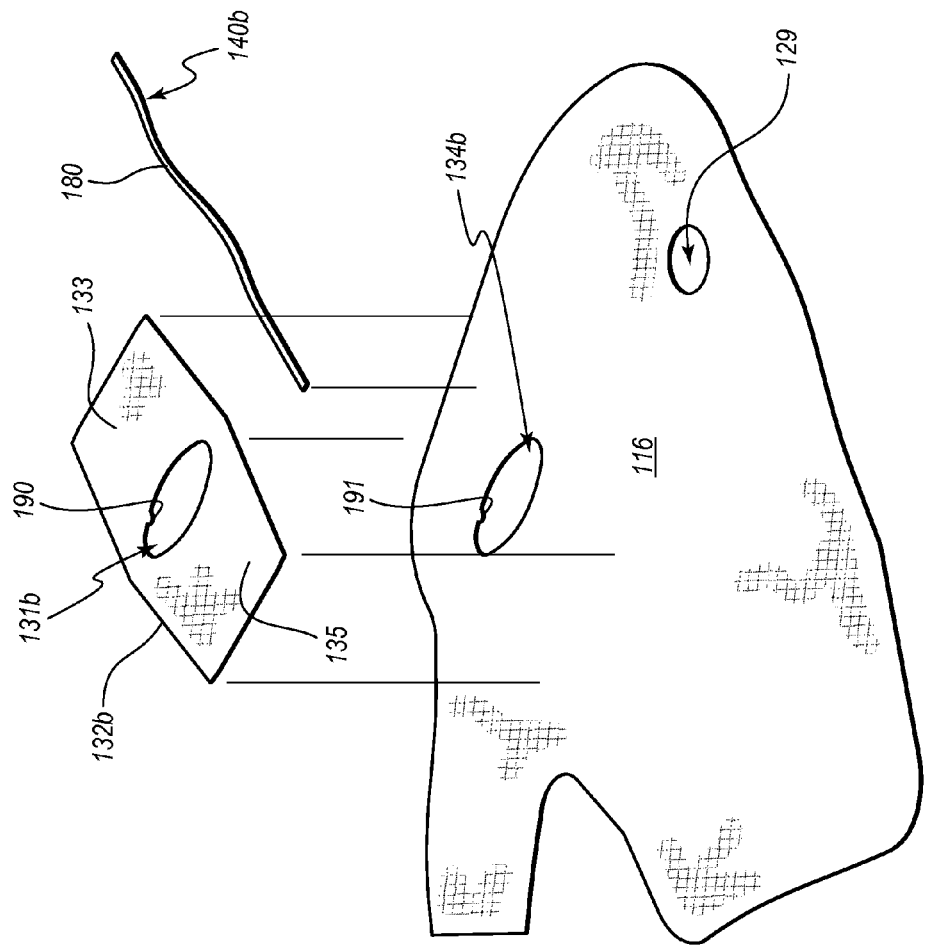
FIGS. 10-13 are perspective views of various stages of a method for assembling an airbag cushion.

The vent tube 132b defines a substantially tubular structure having openings at either end. In particular, the flaps 133, 135 cooperate to define an aperture 136b at a distal end 170 of the vent tube 132b, and the vent tube 132b further includes an aperture 131b at its proximal end 172 (a clearer view of the aperture 131b is shown in FIG. 10). The proximal aperture 131b is aligned with the aperture 134b (see also FIGS. 10 and 11) of the airbag cushion 110 such that when inflation gas exits the airbag cushion 110, it can proceed through both of the apertures 131b, 134b. The inflation gas can further exit through the distal aperture 136b after having passed through the inverted vent tube 132b, as discussed further below with respect to FIG. 5.

The vent tube 132b can define any suitable shape. When flattened, as shown in FIG. 3, the vent tube 132b may be substantially trapezoidal, and when expanded during an airbag inflation event, the tube 132b may be substantially frustoconical. Stated otherwise, when in the flattened state shown, the vent tube may taper inwardly toward a central longitudinal axis in a direction from the proximal end 172 to the distal end 170. Such a configuration may permit the tube 132b to readily be inverted. Any other suitable shape is possible.

In the illustrated embodiment, the strap 140b is attached to each of the flaps 133, 135. Specifically, the strap 140b includes two branches 188, 189 that are attached to the flaps 133, 135, respectively. Each branch 188, 189 extends from a trunk region 187 of the strap 140b, such that the strap 140b substantially defines a Y-shape when viewed in side elevation. As can be appreciated from FIG. 3, and as discussed further below with respect to FIG. 4, when tension forces are exerted on the trunk region 187 in a substantially leftward and downward direction in FIG. 3 (e.g., away from the vent tube 132b), the forces can be distributed to the branches 188, 189 so as to urge the branches 188, 189 toward each other. This, in turn, can urge the portions of the flaps 133, 135 that are attached to the branches 188, 189 toward each other, which can assist in closing the distal aperture 136b.

The branches 188, 189 can be attached to the flaps 133, 135 in any suitable manner. In the illustrated embodiment, the flaps 133, 135 are attached to the flaps 133, 135 via stitching 186. Each branch 188, 189 is attached to its respective flap 133, 135 at a position that is between the lateral sides. In the illustrated embodiment, each branch 188, 189 is attached to its respective flap 133, 135 at a central region 185 thereof that is positioned along the central longitudinal axis $A_X$ of the vent tube 132b. Stated otherwise, the branches 188, 189 can be attached to the flaps 133, 135 at regions that are angularly offset relative to the stitched lateral sides about a perimeter of the vent tube. In the illustrated embodiment, this angular offset is about 90 degrees, such that the lateral sides of the vent tube 132b are diametrically opposed to each other along a first line, the attachment areas for the branches 188, 189 are diametrically opposed to each other along a second line, and the first and second lines are perpendicular to each other. Any other suitable angular offset is possible. Having a 90 degree angular offset can allow for efficient closure of the distal aperture 136b.

Each branch 188, 189 of the strap 140b may also be referred to herein as a strap portion. Of course, any suitable portion of a strap 140b may be referred to as a strap portion. In the illustrated embodiment, each branch 188, 189 of the unitary strap 140b constitutes a separate strap portion; in other embodiments, it is possible to connect separate straps to the flaps 133, 135, such that a strap portion of each of the separate straps is connected to the flaps 133, 135.

Figure 4:
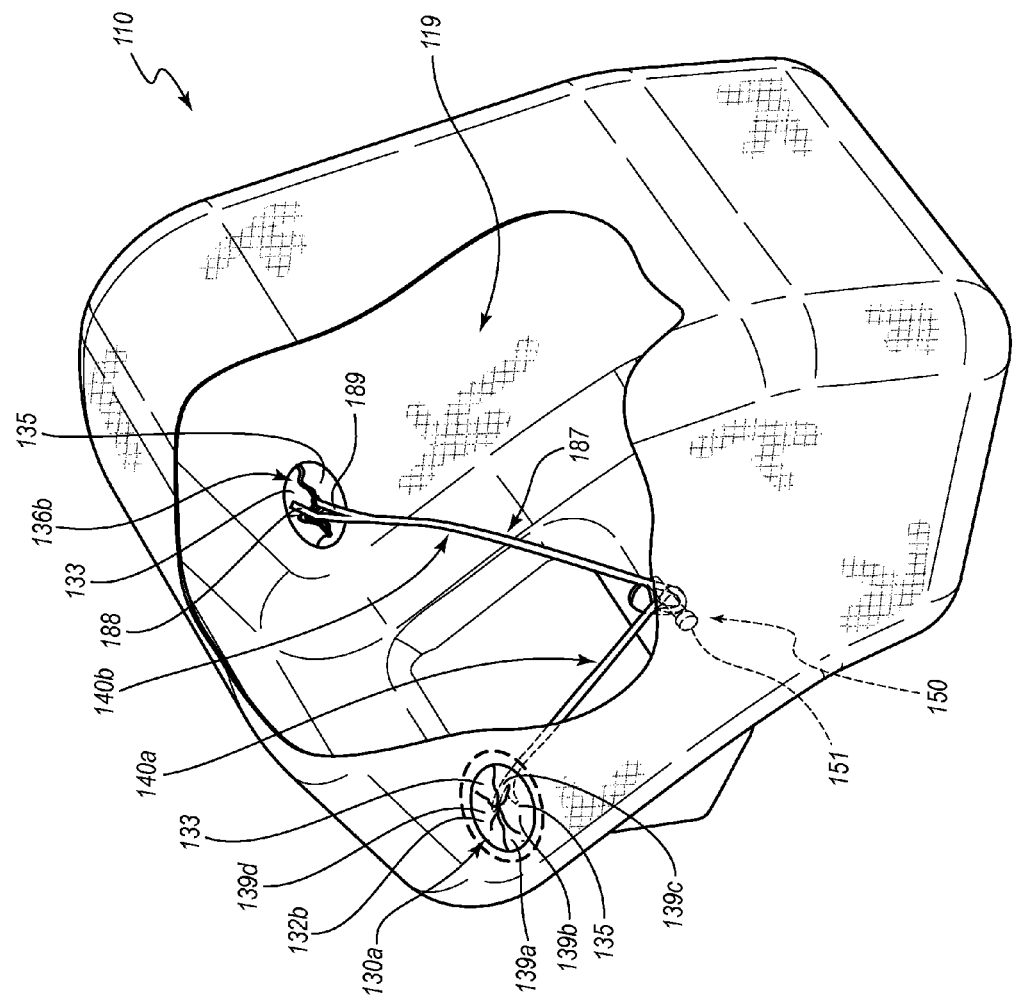
FIG. 4 is a perspective view of the airbag assembly of FIG. 1, wherein a portion of the airbag cushion is shown in cutaway, and wherein the airbag cushion is fully inflated, active vents associated therewith are sealed, and vent straps associated with the active vents are taut.

With continued reference to FIG. 3, in the illustrated embodiment, the strap 140b further includes a coupling region 182. In the illustrated embodiment, the coupling region 182 comprises a loop. As can be seen in FIG. 4, a pin 151 of the strap release mechanism 150 can be inserted or threaded through the loop so as to selectively retain the strap 140b. The illustrated strap 140b is formed from a single, continuous piece of material 180 that is doubled back upon itself and stitched via stitching 184 to form the trunk region 187. Any suitable material is possible for the strap 140b, such as, for example, nylon webbing. Where separate straps are connected to the flaps 133, 135, as discussed above, each separate strap can be independently coupled with the strap release mechanism 150.

The strap 140b can be configured to be of such a length that it is put under tension when airbag membrane 110 is in a deployed configuration and the straps are coupled to the release mechanism 150. Tension in vent strap 140b may cause active vent 130a to adopt the constricted or closed state that inhibits, or substantially prevents, inflation gases from exiting from the airbag cushion 110 through active vent 130a. An illustrative closed state is depicted in FIG. 4 and discussed further below. As can also be seen in FIG. 4, in the illustrated embodiment, each vent strap 140a, 140b includes a looped coupling region through which the pin 151 of the strap release mechanism 150 extends. Both vent straps 140a, 140b can be released by removal of the pin 151. In other or further embodiments, a single vent strap may be connected with both of the active vents 130a, 130b. In certain of such embodiments, the strap may extend through the strap release mechanism 150 so as to be attached to each of the active vents 130a, 130b and maintain them in tension while the strap release mechanism 150 retains the strap, and in further embodiments, the strap release mechanism 150 may cut the strap to permit both active vents 130a, 130b to open. In other or further embodiments, more than one strap may be coupled to each active vent. A variety of still other types and configurations of vent straps can be utilized in other or further embodiments. For example, in some embodiments the vent straps comprise cords of synthetic fibers.

With reference again to FIG. 1, one or more vehicle sensors 160 of a variety of types and configurations can be utilized to detect a single occupant characteristic, a set of occupant characteristics, or a combination of one or more occupant characteristics and vehicle conditions. These occupant and/or vehicle conditions may comprise a set of predetermined conditions that can be used to dictate whether the release device 150 releases one nor more of the vent straps 140a, 140b. For example, in some embodiments, a seat rail sensor is utilized to detect how close or far away from an airbag deployment surface an occupant's seat 18 is positioned. In other or further embodiments, a seat scale may be used to determine whether an occupant is occupying the seat and if so, ascertain an approximate weight of the occupant. In yet other or further embodiments, an optical or infrared sensor may be used to determine an occupant's approximate surface area and/or distance from an airbag deployment surfaces. In other or further embodiments, an accelerometer is employed to measure the magnitude of negative acceleration experienced by a vehicle, which may indicate whether an accident has occurred and the severity of the accident. Additionally, a combination of these and other suitable sensor types may be used.

Airbag assembly 100 can be configured to provide a variety of venting options based on whether specific predetermined occupant and/or vehicle conditions exist during an accident. For example, one or more sensors 160 may detect whether an occupant is sitting in a vehicle seat, how close the seat is positioned to an airbag deployment surface, and the weight and surface area of the occupant. In some arrangements, if sensors 160 determine that an occupant is present in a seat and has a weight and/or surface area that is above a predetermined threshold, that the occupant is positioned beyond a predetermined distance from an airbag deployment surface, and/or that an acceleration event is generating a predetermined range of negative acceleration, in case of cushion 110 deployment, release device 150 may not release vent straps 140a, 140b. If release device 150 does not release vent straps 140a, 140b, then upon cushion 110 deployment, the straps will be placed under tension, which will cause vents 130a, 130b to adopt a closed state (e.g., FIG. 4). When vents 130a, 130b are in the closed state, little or no inflation gas is allowed to be vented from the inflatable void 119 of cushion 110 to outside the cushion, and the cushion is more firm than if the active vents 130a, 130b were in the open state (e.g., FIG. 5).

Figure 5:
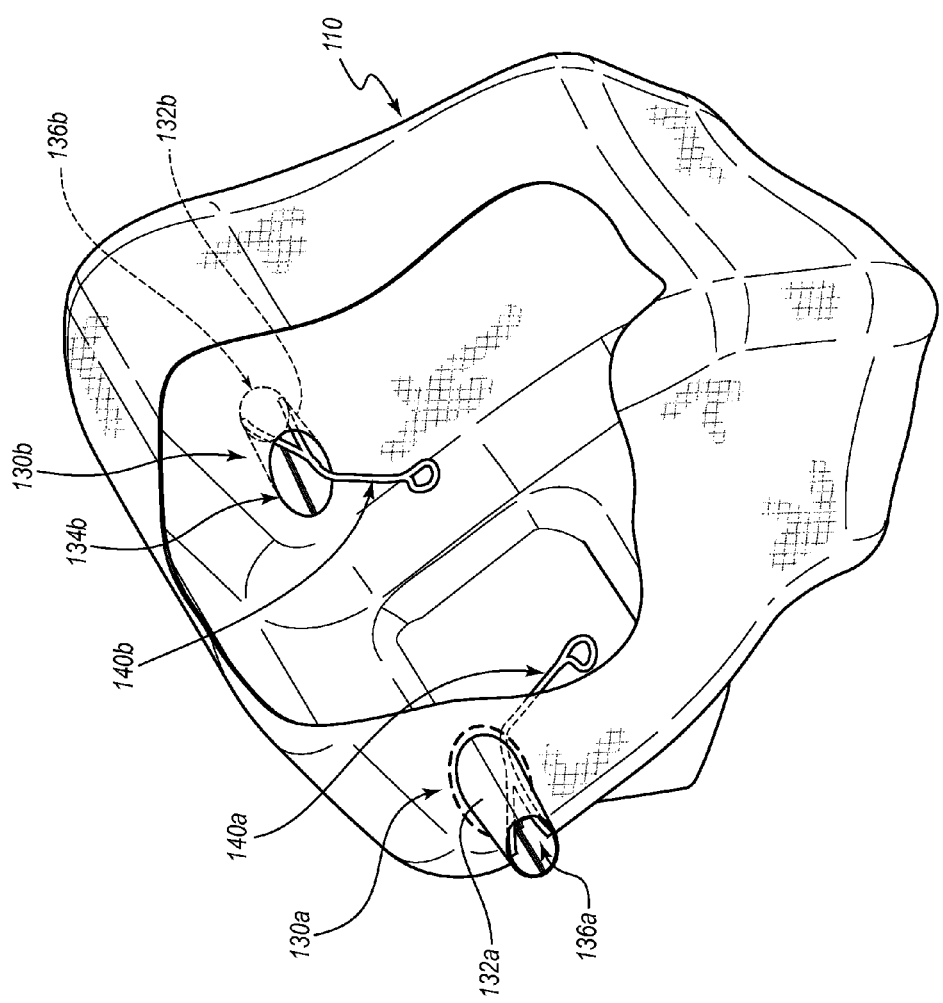
FIG. 5 is a perspective view of the airbag assembly of FIG. 1, wherein a portion of the airbag cushion is shown in cutaway, wherein the vent straps have been released and the active vents are open.

FIGS. 2, 4, and 5 depict the airbag assembly 100 in various deployment configurations. In FIG. 2, the airbag cushion 110 is in the process of being filled with inflation gases. The release device 150 retains the vent straps 140a, 140b, but the vent straps 140a, 140b are slack, as the airbag cushion 110 has not fully expanded. The vent tubes 132a, 132b of the active vents 130a, 130b generally remain in a packaged or undeployed configuration, in which pressure within the airbag cushion not yet had significant effect on the active vents 130a, 130b to change them from their original, packaged orientation, although the airbag cushion 110 has significantly changed from its packaged orientation at this stage so as to expand about the vent tubes 132a, 132b. Pressure from the inflation gases may generally tend to push the flaps 133, 135 (see FIG. 3) of the vent tubes 132a, 132b together at this stage.

FIG. 4 illustrates airbag assembly 100 in a deployed and closed configuration. In this configuration, the release device 150 continues to retain the vent straps 140a, 140b. The cushion 110 has fully expanded and the active vents 130a, 130b are in a closed orientation. As the cushion 110 expands to the orientation shown in FIG. 4, tension rises in the straps 140a, 140b. The tension forces in the trunk regions 187 are directed toward the pin 150, which tends to draw the branches 188, 189 toward each other, thus urging the flaps 133, 135 toward each other to assist in closing the distal apertures 136a, 136b of the vent tubes 132a, 132b. Air pressure at the exterior of the flaps 133, 135 further presses them together to close the apertures 136a, 136b. In the illustrated embodiment, the branches 188, 189 of the straps 140a, 140b are attached only to the exterior surfaces of the vent tubes 132a, 132b. In some arrangements, this can further assist in closing the apertures 136a, 136b, as the forces are provided at an exterior of the vent tubes 132a, 132b, and since the branches 188, 189 do not interfere with a seal provided by, or otherwise separate, the inner surfaces of the flaps 133, 135, as they might otherwise do if at least a portion thereof were positioned at inner surfaces of the flaps 133, 135.

As previously discussed with respect to FIG. 3, each vent tube 132a, 132b of the illustrated embodiment includes four reinforced regions—namely the regions to which the branches 188, 189 are stitched and the stitched lateral sides of the vent tubes 132a, 132b. For each vent tube, the four reinforced regions are angularly offset relative to each other. With continued reference to FIG. 4, depending on the fully extended length of the straps 140a, 140b, the vent tubes 132a, 132b may begin to invert at or through the airbag cushion 110 at this stage, but may be stopped from fully inverting due to the straps 140a, 140b. The reinforced regions of the vent tubes 132a, 132b can affect the manner in which this inversion occurs. For example, in the illustrated embodiment, the reinforced regions tend to be urged toward a central axis of each vent 130a, 130b—this is clearly shown with respect to the portions of the vent tube 132b that are attached to the branches 188, 189 of the strap 140b. A separate pocket 139a, 139b, 139c, 139d can form about each reinforced region. Thus, in the illustrated embodiment, four pockets are formed. The pockets can expand as gas pressure within the airbag cushion 110 increases, which can tend to seal the vent tubes 132a, 132b. For example, the pockets 139d, 139b above and below the flaps 133, 135 of the vent tubes 132a, 132b can, in particular, tend to close the distal apertures 136a, 136b of the vent tubes 132a, 132b.

FIG. 5 depicts airbag assembly 100 in a deployed and released configuration. The tethers 140a, 140b have been released from the release device 150, which has permitted the vent tubes 132a, 132b to invert through the apertures 134a, 134b of the cushion 110. The vent tubes 132a, 132b are thus generally positioned at an exterior of the cushion 110. Inflation gas can exit through the apertures 134a, 134b, and subsequently through the distal apertures 136a, 136b of the vent tubes 132a, 132b. As the vents 130a, 130b are in an open configuration, the cushion 110 may not be fully expand and/or is not as stiff as it would be when the vents 130, 130b are in the closed configuration.

In some embodiments, a single deployment event may proceed through the stages shown in FIG. 2, then FIG. 4, then FIG. 5. For example, the cushion 110 may be fully inflated prior to release of the tethers 142a, 140b. However, in many implementations, FIGS. 4 and 5 may represent different airbag 110 deployment events. The decision whether to release the vent straps may be communicated by a sensor or other suitable device to the release device 150 before and/or during airbag cushion deployment.

In various embodiments, if the vehicle sensors 160 determine that no occupant is present in a seat; that the occupant has a small weight and/or surface area and/or is positioned within a predetermined distance from an airbag deployment surface; and/or that an acceleration event is generating a predetermined range of negative acceleration, release device 150 may release the vent straps 140a, 140b. This allows any tension on straps 140a, 140b to be released; due to the lack of tension and positive pressure of the inflation gas within cushion 110, vent tubes 132a, 132b may be inverted and pushed to the outside of the cushion 110, as previously mentioned. With the vents 130a, 130b in the open state, their capacities to vent inflation gas can soften the cushion compared to a deployment with the vents in the closed state. In other instances, in response to predetermined conditions, cushion membrane 110 may be deployed with minimized venting, wherein the release device does not release the vent straps 140a, 140b.

A variety of types and configurations of seams can be utilized to couple a vent to a cushion membrane. For example, the seam may be formed by stitching, adhesive, radio frequency welding, heat sealing, or any other suitable technique or combination of techniques. A variety of configurations of vents and vent straps can be utilized to selectively restrict the ability of a vent to permit egress of inflation gas. For example, the vent may have any suitable shape such as rectangular, triangular, or polygonal shapes.

Figure 6:
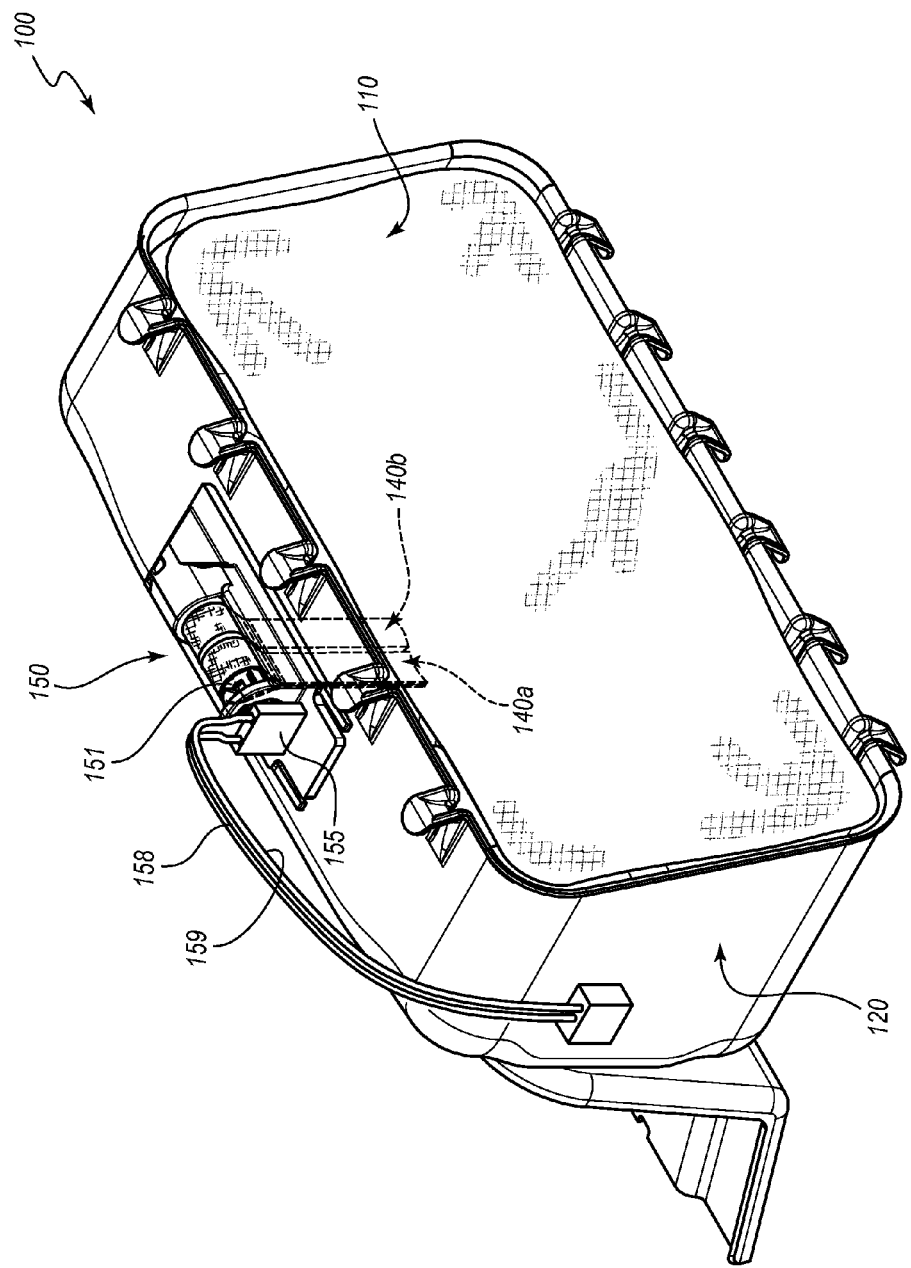
FIG. 6 is a perspective view the airbag assembly of FIG. 1 providing a detail view of an embodiment of a strap release mechanism that retains a vent strap.
Figure 7:
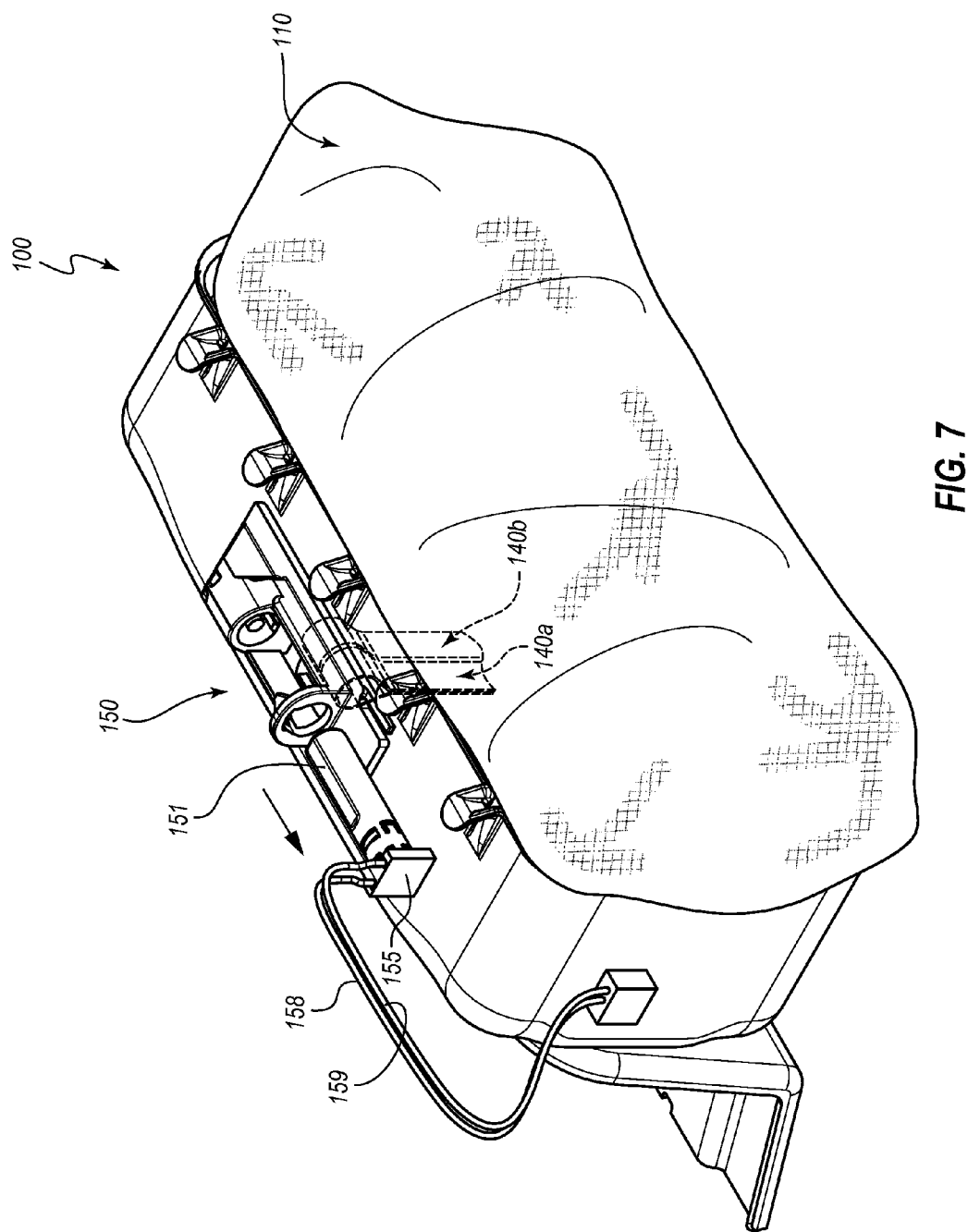
FIG. 7 is another perspective view of the airbag assembly of FIG. 1 providing a detail view of the strap release mechanism of FIG. 6 after it has released the vent strap.

With reference to FIGS. 6 and 7, release device 150 may be attached to housing 120 and comprises any suitable actuator 155 (e.g., a squib or other suitable device). Release device 150 is in electronic communication with one or more vehicle sensors, wherein the detection of predetermined occupant characteristics, vehicle conditions, or a combination of occupant and vehicle conditions dictates whether the release device will release vent straps 140a, 140b, as discussed above. In the illustrated embodiment, the looped coupling portions of the straps 140a, 140b surround a slideable pin 151 in the release device 150. With reference to FIG. 6, if vehicle sensors determine that the release device should not release the vent tethers, the slideable pin does not move and retains the vent straps as depicted in FIG. 4. With reference to FIG. 7, if the sensors detect predetermined conditions which indicate a need for increased cushion venting, upon deployment of cushion 110, the pin 151 may be ejected from a retention assembly so as to release the vent straps 140a, 140b, which may allow vents 130a, 130b to adopt an open state, as depicted in FIG. 5. In the illustrated embodiment, signals used to actuate the actuator 155 may be delivered via one or more electrical wires 158, 159.

A variety of types and configurations of vent strap release devices can be utilized. For example, in other embodiments (such as described below with respect to FIGS. 8-9B), the release device comprises a strap cutter, wherein a blade is actuated by inflation gas from the inflator or by a separate pyrotechnic or electric device. In other or further embodiments, various methods and techniques of coupling the vent straps to the release device may be employed, such as tying, gluing, and using hardware including one or more bolts, screws, pins, or bands.

Figure 8:
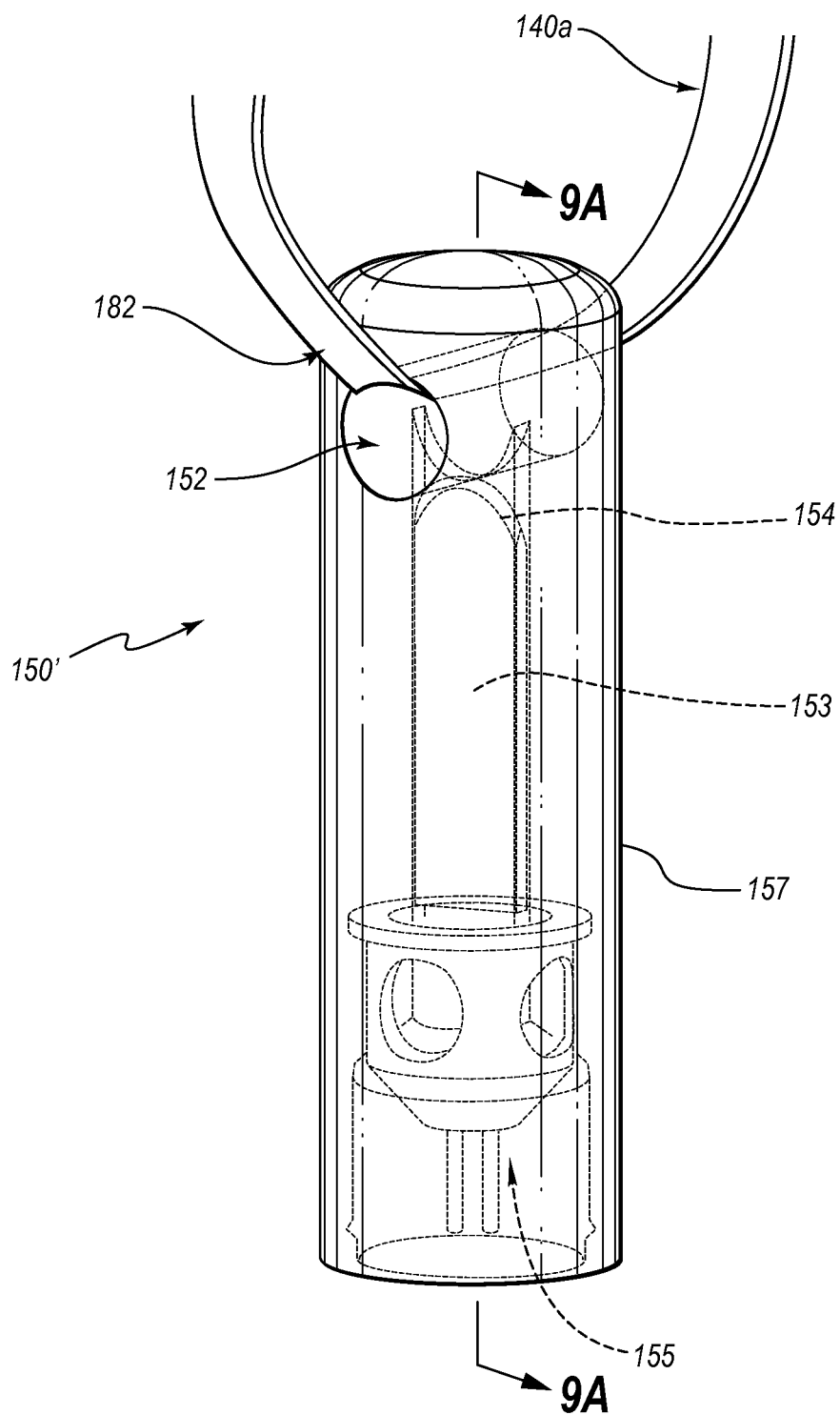
FIG. 8 is a perspective view of another embodiment of a strap release mechanism that retains a vent strap.

FIG. 8 depicts vent strap release device 150' from a perspective view. In the depicted embodiment, release device 150' comprises a strap cutter. Other vent strap cutters and vent strap release device are known in the art, including those disclosed in U.S. Pat. Nos. 6,808,205; 6,932,384; 7,249,783; and 7,419,184, the entire contents of which are hereby incorporated by reference. Release device 150' comprises a strap cutter having a body 157, an aperture 152, a blade 153, an edge of the blade 154, and an initiator 155. A coupling portion 182 of vent strap 140a protrudes through aperture 152 and is retained within the aperture such that the strap may be cut upon airbag deployment and activation of initiator 155. Blade 153 and blade edge 154 are slideably disposed within release device 150' such that upon activation of initiator 155, the blade can slide within body 157 and cut strap 140, thereby releasing the strap. Although only vent strap 140a is depicted, in some embodiments, both vent straps 140a may protrude through the aperture 152.

Figure 9A:
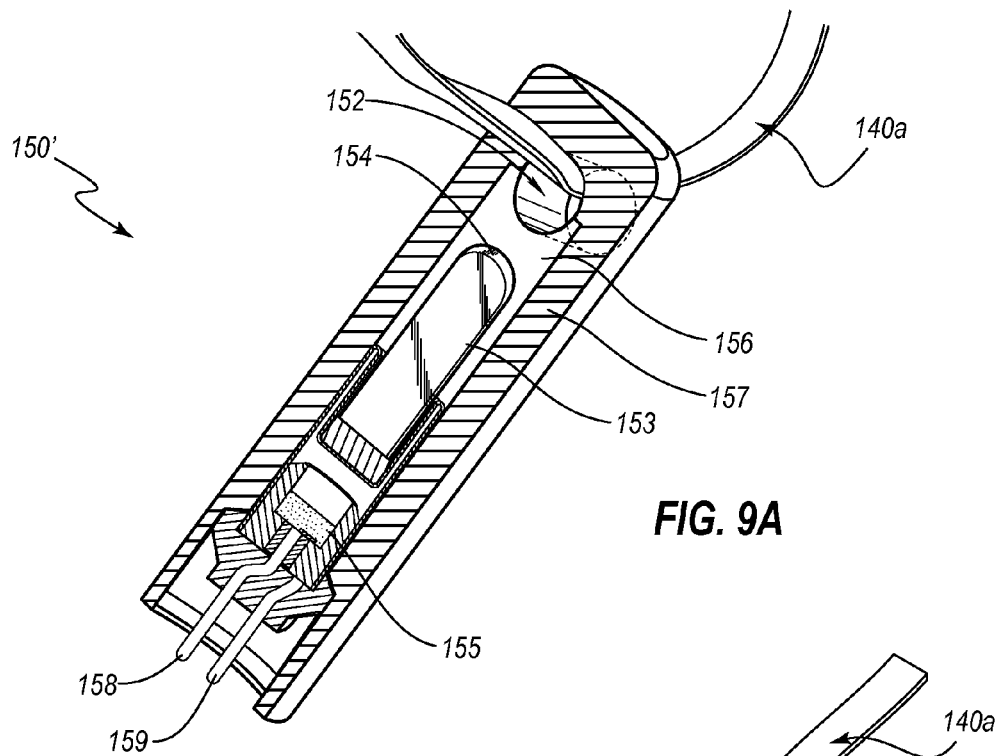
FIG. 9A is a cross-sectional view of the strap release mechanism of FIG. 8 taken along the view line 9A-9A in FIG. 8.
Figure 9B:
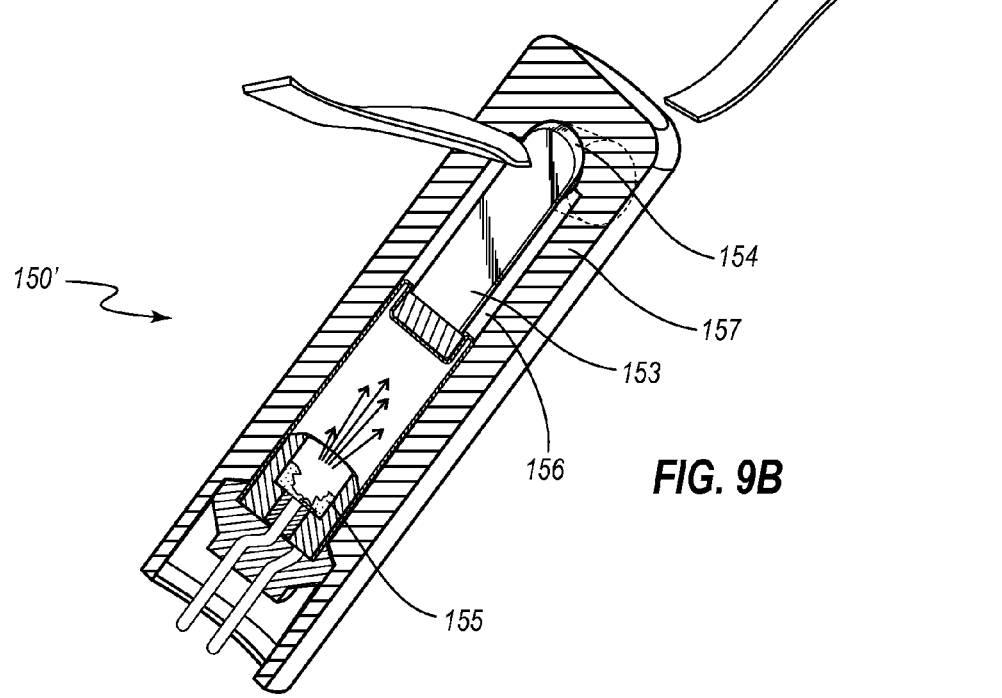
FIG. 9B is a cross-sectional view of the strap release mechanism of FIG. 8, such as the view shown in FIG. 9A, wherein the vent strap has been released via cutting.

FIGS. 9A and 9B are cutaway perspective views of release device 150' before and after initiator 155 has been activated, thereby cutting and releasing vent strap 140a. Initiator 155 may comprise a first wire 158 and a second wire 159 that may be in electronic communication with a sensor, a vehicle computer, or an electric or electronic relay device. Initiator 155 may be activated via signals or electricity from first and second wires 158 and 159. Initiator 155 may comprise an inherent seal such that upon activation of the initiator, pyrotechnic residues are not released outside release device 150'. In an alternative embodiment, initiator 155 does not comprise an inherent seal.

Release device 150' may be mounted on a cushion side of an airbag housing, or alternatively, the release device may be located on a non-airbag cushion side of the housing. As depicted in FIG. 8A, the release device 150' comprises a slot 156 that is configured to allow blade 153 to slide within the slot. Upon activation of initiator 155, blade 153 may be pushed upward within slot 156 in the direction of aperture 152 and vent strap third portion 143. Blade 153 may continue to travel axially within slot 156 such that edge of blade 154 enters aperture 152, contacts vent strap third portion 143 and severs the vent strap.

FIGS. 10-13 illustrate various stages of a method for forming an airbag assembly 100. In the illustrated embodiment, a single piece of material used to form the vent tube 132b is shown being attached to a side panel 116. Although a panel construction of the cushion 110 is shown, it is understood that other airbag cushion 110 arrangements are also possible. Moreover, where airbag panels are used, the panels may be formed into a complete airbag cushion 110 before, after, or at any other suitable stage during assembly of the airbag assembly 100.

With reference to FIG. 10, in the illustrated embodiment, the side panel 116 includes a discrete vent 129. The side panel 116 further includes an aperture 134b, which is substantially ovoid. The aperture 134b includes an alignment tab 191. Any other suitable alignment feature may be used with or in place of the alignment tab 191.

In the illustrated embodiment, the vent tube 132b is formed from a single piece of material. In other embodiments, more pieces of material may be used. The material used to form the vent tube 132b may be the same as or different from the material of the side panel 116. For example, in some embodiments, the material used for the vent tube 132b may be more flexible.

The vent tube material defines an aperture 131b and an alignment tab 190. The material further includes a first flap 133 and a second flap 135 that extend away from the aperture 131b in opposite directions. A strap 140b may be attached to the vent tube material, and may be formed from a single piece 180 of strap material. In the stage shown in FIG. 10, the apertures 131b, 134b and the alignment tabs 190, 191 are aligned.

Figure 11:
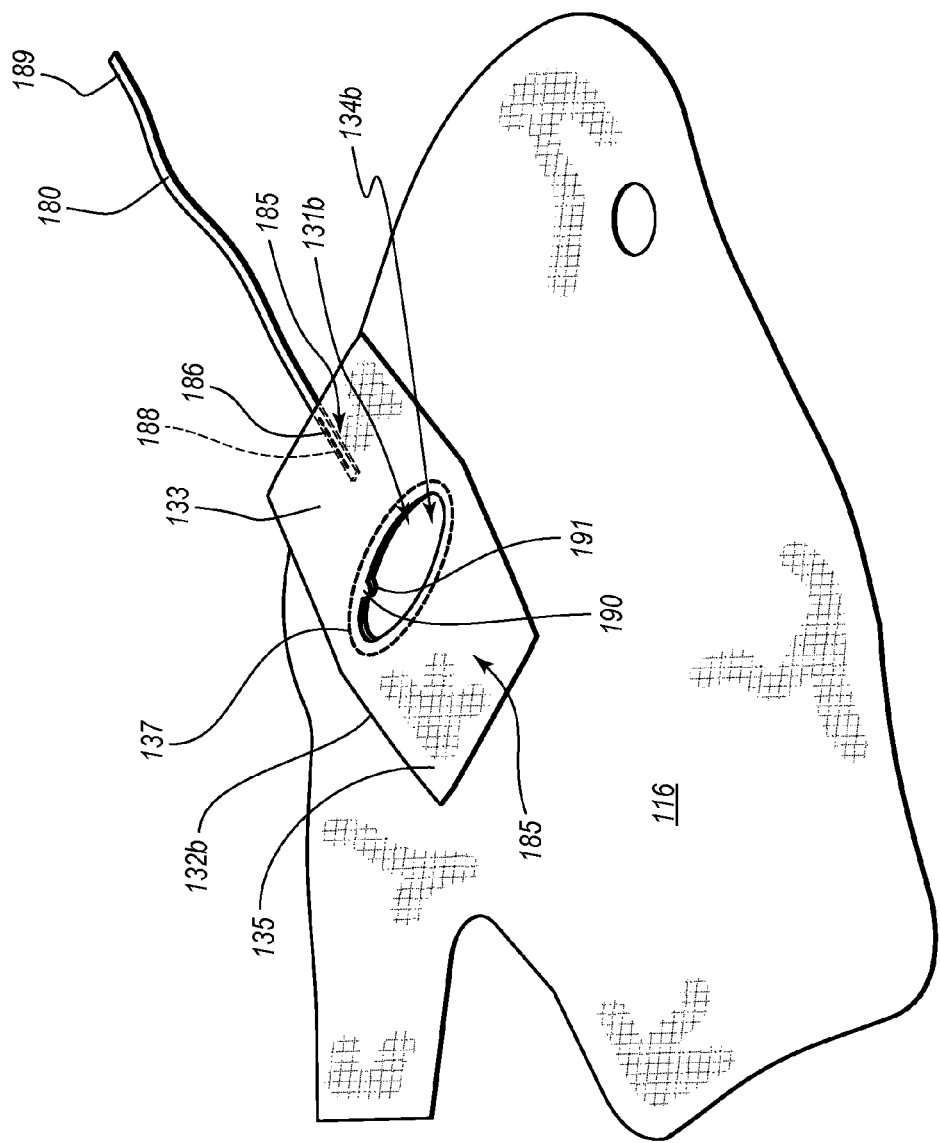

With reference to FIG. 11, the piece of vent tube material and the side panel 116 are attached to each other about a full periphery of the apertures 131b, 134b. In the illustrated embodiment, a line of stitching 137 extends through both sheets of material about a full periphery of the apertures 131b, 134b. A first branch 188 of the strap material 180 is attached to the first flap 133 in any suitable manner, such as via stitching element 186. In the illustrated embodiment, the attachment is made at the central region 185 of the first flap 133.

Figure 12:
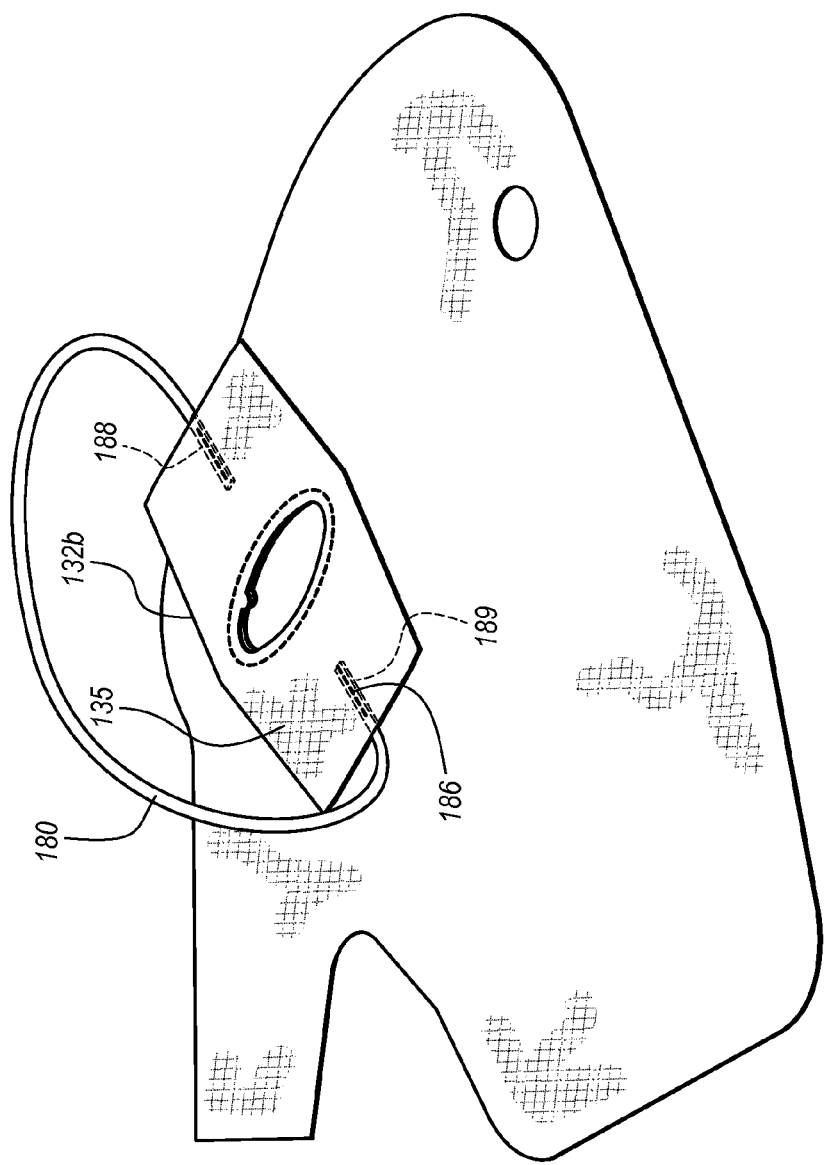

With reference to FIG. 12, a second branch 189 of the strap material 180 is attached to the second flap 135 in any suitable manner, such as via stitching element 186. In the illustrated embodiment, the attachment is made at the central region 185 of the second flap 135.

Figure 13:
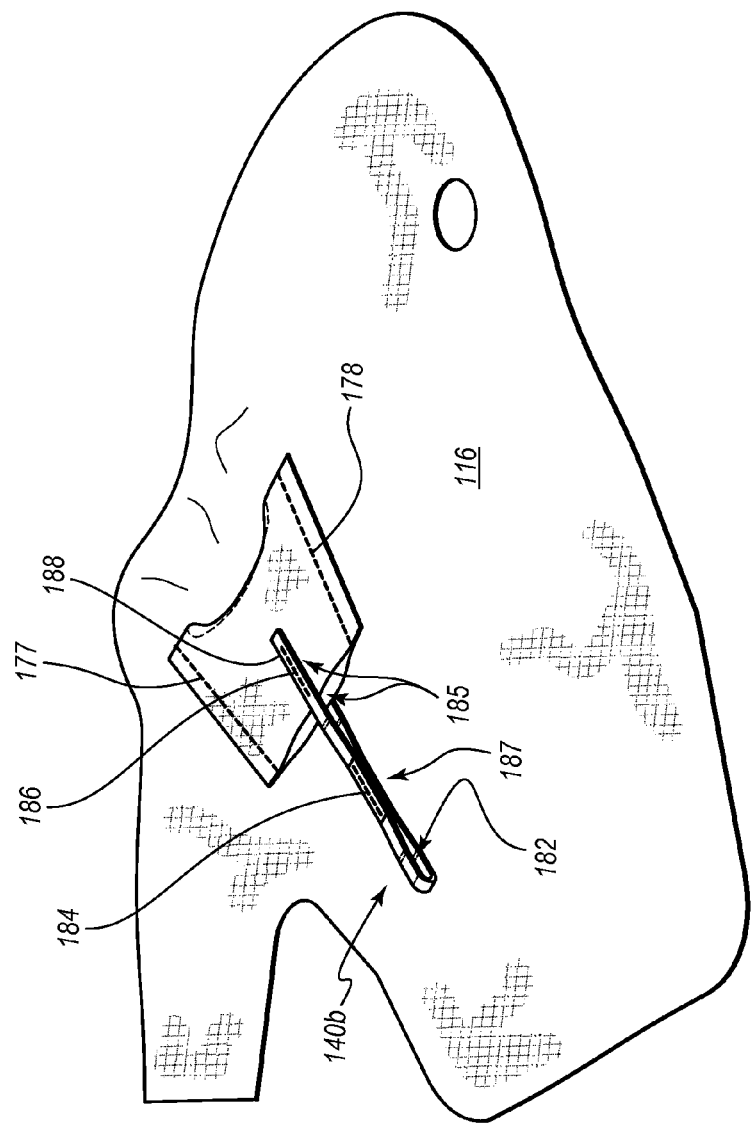

With reference to FIG. 13, the lateral sides of the first and second flaps 133, 135 are attached to each other in any suitable manner, such as via the stitching elements 177, 178. Stitching 184 is also used to join portions of the strap material 180 so as to form the trunk region 187. An open loop is maintained at the end of the strap 140b, which can be used as a coupling region as discussed above. Any suitable order of the foregoing stages and steps is contemplated.

Figure 14:
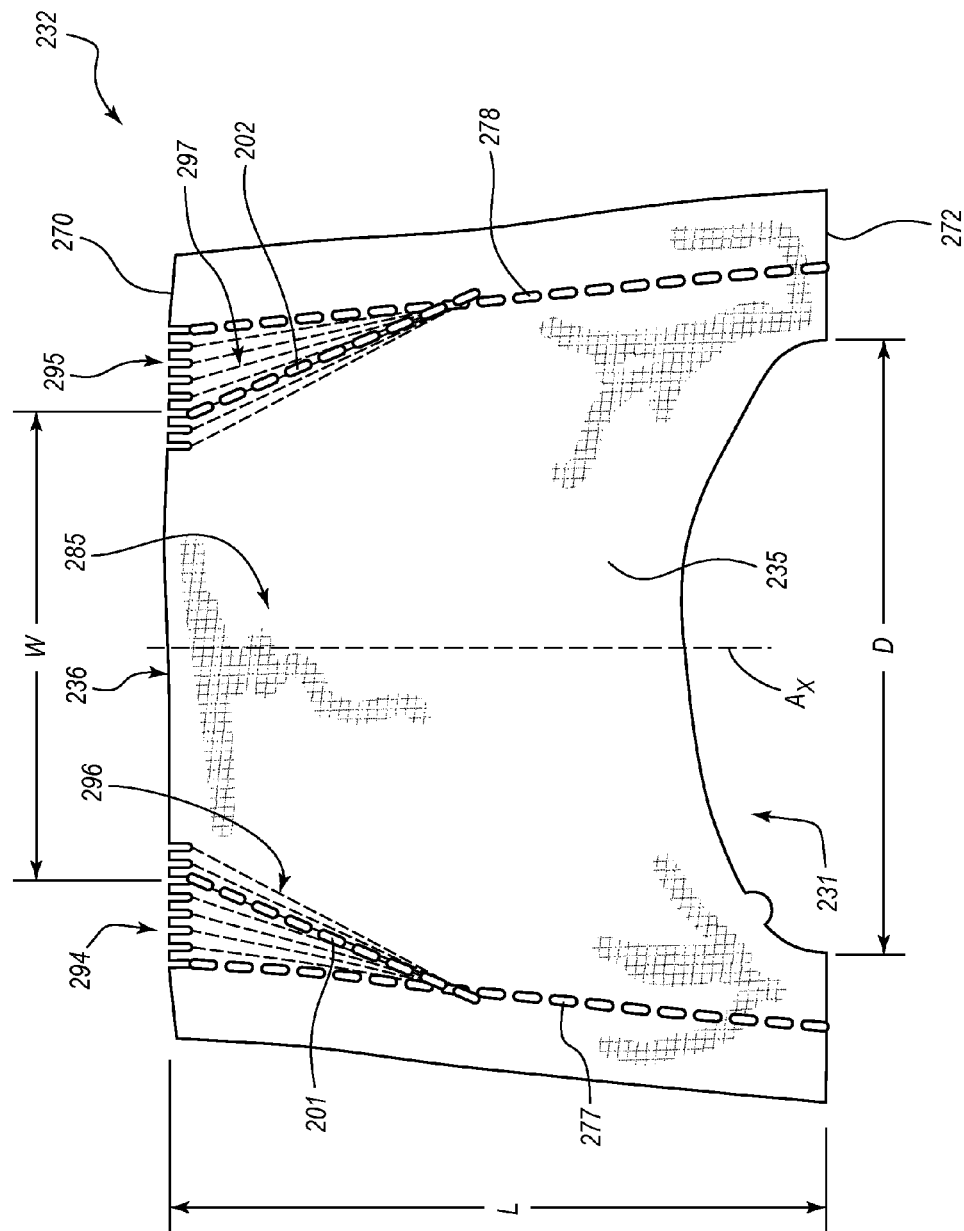
FIG. 14 is a plan view of an embodiment of a vent tube that has readily tunable venting characteristics.

FIG. 14 illustrates another embodiment of a vent tube 232 that can resemble the vent tubes 232a, 232b described above in certain respects. Accordingly, like features are designated with like reference numerals, with the leading digits incremented to "2." Relevant disclosure set forth above regarding similarly identified features thus may not be repeated hereafter. Moreover, specific features of the vent tube 230 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the vent tube 232. Any suitable combination of the features and variations of the same described with respect to the vent tubes 232a, 232b can be employed with the vent tube 232, and vice versa.

The vent tube 232 includes a flap 235 that is approximated to another flap (not shown) in a manner such as described above with respect to the flaps 133, 135. The flaps can be sewn together along their lateral sides via a first set of stitching 277, 278. In the illustrated embodiment, the stitching 277, 278 extends between a proximal end 272 and a distal end 270 of the vent tube 232.

In some embodiments, a second set of stitching 201, 202 can be used to tune the operational characteristics of the vent tube 232, or stated otherwise, to tune inflation characteristics of an airbag assembly. The illustrated embodiment includes a plurality of alignment features at the distal end 270. Any suitable alignment features are contemplated. In the illustrated embodiment, the alignment features comprise notches 294, 295 that are symmetrically disposed on opposite sides of a central longitudinal axis $A_X$ of the vent tube 232. The alignment features can be used to readily adjust a width W of a distal aperture 236. For example, a diameter D of a proximal aperture 231 may remain constant, and the aperture 231 may be aligned with, and attached adjacent to, a corresponding aperture in an airbag cushion. Accordingly, in order to tune the inflation characteristics of the airbag cushion, it may be desirable to adjust only the width W of the distal aperture 236. This can be accomplished by running the second set of stitching 201, 202 from a preselected position along a longitudinal length L of the vent tube 232 (such as approximately a midpoint of the length L, as shown in the illustrated embodiment) to a desired pair of notches 294, 295. Thus, a variety of stitching paths 296, 297 from the preselected position are possible. Such adjustments to the size of the distal aperture 236 can advantageously be made whether or not a strap is already attached at a central region 285 of the panel 235. In other embodiments, only a single set of stitches is provided that extends from the distal end 272 to the desired pair of notches 294, 295. In further embodiments, adjustments to the width W can be made by providing additional stitches that extend from the same points at the distal end 272 to a narrower pair of notches 294, 295.

In various embodiments, the length L of the vent tube 232 is shorter than may be achieved with other vent tube arrangements. In some embodiments, the length L is no greater than 150, 160, 170, 175, 180, 185, 190, or 200 millimeters. In other or further embodiments, the diameter D may be within a range of from about 100 millimeters to about 120 millimeters, and the width W may be within a range of from about 70 millimeters to about 110 millimeters. In some embodiments, a relatively short vent tube 232 and/or a vent tube exhibiting one or more other properties such as described herein (such as the pocket formations), can transition quickly from a closed orientation to an open orientation. In various embodiments, the transition may take place within a range of from about 3 milliseconds to about 5 milliseconds.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly comprising:
an airbag cushion configured to define an interior volume when deployed;
a vent tube comprising a distal end that defines a distal aperture and comprising a proximal end that is coupled with the airbag cushion, wherein the vent tube further comprises a first region and a second region that are at opposite sides of the vent tube;
a first strap portion attached to the vent tube at the first region; and
a second strap portion attached to the vent tube at the second region,
wherein the first and second strap portions are configured to be placed under tension to urge the opposite sides of the vent tube together to close the vent tube during deployment of the airbag cushion.

2. The airbag assembly of claim 1, wherein a strap comprises a first branch that defines the first strap portion and comprises a second branch that defines the second strap portion, and wherein the strap comprises a trunk region from which each of the first and second branches extend.

3. The airbag assembly of claim 2, wherein the first and second branches of the strap are attached to the vent tube at only an exterior surface of the vent tube, as determined prior to deployment of the airbag.

4. The airbag assembly of claim 3, wherein the vent tube is configured to be inverted through a proximal aperture at the proximal end of the tube such that the exterior surface of the vent tube becomes an interior surface of the vent tube.

5. The airbag assembly of claim 1, wherein the vent tube comprises two lateral sides that each comprise stitching, wherein the lateral sides are diametrically opposed and are offset from the first and second regions of the vent tube at which the first and second strap portions are attached, wherein the lateral sides of the vent tube and the portions of the vent tube at which the first and second strap portions are attached reinforce the vent tube to cause the vent tube to form pockets as pressure increases within the airbag cushion when the airbag cushion is deployed and while the first and second strap portions are under tension.

6. The airbag assembly of claim 5, wherein pressure within the pockets assists in closing the distal aperture of the vent tube.

7. The airbag assembly of claim 1, further comprising a release mechanism coupled with each of the first and second strap portions, wherein the release mechanism is configured to selectively retain the first and second strap portions.

8. The airbag assembly of claim 7, wherein the release mechanism is configured to release the first and second strap portions either to prevent the first and second strap portions from being placed under tension when one or more predetermined vehicle conditions have been met or to release tension from the first and second strap portions when one or more predetermined vehicle conditions have been met.

9. The airbag assembly of claim 8, wherein the one or more predetermined vehicle conditions comprise one or more of a weight of a vehicle occupant and a position of a vehicle occupant.

10. The airbag assembly of claim 1, wherein the vent tube comprises two lateral sides that each comprise stitching and are offset from the first and second regions of the vent tube.

11. The airbag assembly of claim 10, wherein a size of the distal aperture of the vent tube is delimited by the stitching.

12. The airbag assembly of claim 10, wherein the vent tube comprises additional stitching that reduces a size of the distal aperture, as compared with a size that the distal aperture would have in the absence of the additional stitching.

13. The airbag assembly of claim 1, wherein the vent tube is tapered inwardly toward a central longitudinal axis thereof in a direction from the proximal end to the distal end.

14. The airbag assembly of claim 1, wherein the proximal end of the vent tube defines an alignment tab that is aligned with an alignment tab defined by the airbag cushion.

15. The airbag assembly of claim 1, further comprising a release mechanism coupled with each of the first and second strap portions via a loop, wherein the release mechanism comprises a pin positioned within the loop, wherein the release mechanism is configured to be selectively decoupled from the first and second strap portions by removing the pin from the loop.

16. The airbag assembly of claim 1, further comprising a release mechanism coupled with each of the first and second strap portions via a coupling region of a unitary strap, wherein the strap comprises each of the first and second strap portions, and wherein the release mechanism is configured to be selectively decoupled from the first and second strap portions by cutting the coupling region of the strap.

17. The airbag assembly of claim 1, wherein the vent tube comprises a plurality of size indicators for use in adjusting a size of the distal opening.

18. The airbag assembly of claim 17, wherein the size indicators are positioned on opposite sides of the first region such that the size indicators can be used in adjusting a size of the distal opening without altering a position at which the first branch is attached to the vent tube.

19. The airbag assembly of claim 17, wherein the size indicators comprise notches.

20. The airbag assembly of claim 1, wherein the vent tube comprises an exterior surface, as determined prior to deployment of the airbag, and wherein each of the first and second strap portions are attached to the vent tube only at the exterior surface of the vent tube.

21. The airbag assembly of claim 20, wherein the vent tube is configured to be inverted through a proximal aperture at the proximal end of the tube such that the exterior surface of the vent tube becomes an interior surface of the vent tube.

22. An airbag assembly comprising:
an airbag cushion configured to define an interior volume when deployed, wherein the airbag cushion defines an aperture;
a vent tube comprising a distal end that defines a distal aperture and comprising a proximal end that defines a proximal aperture and is coupled with the airbag cushion, wherein the vent tube further comprises a first region, a second region, and a pair of lateral reinforced regions that are each offset from each of the first and second regions;
a first strap portion attached to the vent tube at the first region such that the first region is reinforced; and
a second strap portion attached to the vent tube at the second region such that the second region is reinforced;
wherein the first and second strap portions are configured to be placed under tension to urge the first and second regions of the vent tube together to close the vent tube during deployment of the airbag cushion.

23. The airbag assembly of claim 22, further comprising a release mechanism coupled with the first and second strap portions so as to selectively retain the first and second strap portions.

24. The airbag assembly of claim 22, wherein portions of the vent tube that are positioned between each reinforced region and the first region and that are positioned between each reinforced region and the second region define pockets that are configured to expand to assist in closing the vent tube while the first and second strap portions are under tension.

25. The airbag assembly of claim 22, wherein each lateral reinforced region comprises stitching.

26. A method of forming an airbag assembly comprising:
aligning a proximal aperture in a piece of vent tube material with an aperture in a piece of airbag cushion material, wherein the vent tube material comprises a first flap and a second flap that extend away from the proximal aperture in opposite directions;
stitching through the vent tube material and the airbag cushion material around both apertures to join the vent tube material to the airbag cushion material;
stitching a first set of lateral sides of the first and second flaps to each other;
stitching a second set of lateral sides of the first and second flaps to each other to form a tube structure that includes a distal aperture; and
attaching a first strap portion to the first flap at a position between the lateral sides of the first flap and attaching a second strap portion to the second flap at a position between the lateral sides of the second flap.

27. The method of claim 26, further comprising stitching the first and second flaps to reduce a size of the distal aperture.

28. The method of claim 26, wherein stitching the second set of lateral sides of the first and second flaps to each other comprises controlling a size of the distal aperture to tune inflation characteristics of the airbag assembly.

29. The method of claim 28, wherein the piece of vent tube material comprises a plurality of notches, wherein stitching the first set of lateral sides of the first and second flaps to each other comprises aligning a stitch with a first of the plurality of notches, and wherein stitching the second set of lateral sides of the first and second flaps to each other comprises aligning a stitch with a second of the plurality of notches.

30. The method of claim 26, wherein the vent tube material and the airbag cushion material each includes an alignment tab, and wherein said aligning comprises aligning the alignment tabs with each other.

* * * * *